US010905919B2

(12) United States Patent
Le et al.

(10) Patent No.: US 10,905,919 B2
(45) Date of Patent: Feb. 2, 2021

(54) BALL AND METHOD FOR ITS MANUFACTURE

(71) Applicant: adidas AG, Herzogenaurach (DE)

(72) Inventors: Tru Huu Minh Le, Herzogenaurach (DE); Hans-Peter Nürnberg, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 15/166,943

(22) Filed: May 27, 2016

(65) Prior Publication Data

US 2016/0346627 A1 Dec. 1, 2016

(30) Foreign Application Priority Data

May 28, 2015 (DE) .................. 10 2015 209 795

(51) Int. Cl.
| | | |
|---|---|---|
| *A63B 45/00* | (2006.01) | |
| *A63B 41/00* | (2006.01) | |
| *B29D 22/02* | (2006.01) | |
| *A63B 37/02* | (2006.01) | |
| *A63B 39/02* | (2006.01) | |
| *B29D 22/04* | (2006.01) | |

(Continued)

(52) U.S. Cl.
CPC .............. *A63B 45/00* (2013.01); *A63B 37/02* (2013.01); *A63B 39/027* (2013.01); *A63B 41/00* (2013.01); *B29C 41/04* (2013.01); *B29D 22/02* (2013.01); *B29D 22/04* (2013.01); *A63B 2243/0025* (2013.01); *B29C 41/20* (2013.01); *B29C 41/22* (2013.01); *B29L 2031/54* (2013.01)

(58) Field of Classification Search
CPC . A63B 41/00; A63B 41/08; A63B 2243/0025; A63B 45/00; A63B 37/02; A63B 39/027; B29D 22/04; B29D 22/02; B29C 41/04; B29C 41/20; B29C 41/22; B29L 2031/54
See application file for complete search history.

(56) References Cited

U.S. PATENT DOCUMENTS

| D64,898 S | 6/1924 | Gunlock | |
|---|---|---|---|
| 1,614,853 A * | 1/1927 | Schwartz | ............... A63B 39/06 |
| | | | 264/45.5 |

(Continued)

FOREIGN PATENT DOCUMENTS

| CN | 1034662 | 8/1989 |
|---|---|---|
| CN | 1036128 | 10/1989 |

(Continued)

OTHER PUBLICATIONS

Definition of particle, <<www.dictionary.com/browse/particle>>, retrieved on Oct. 10, 2018.*

(Continued)

*Primary Examiner* — Steven B Wong
(74) *Attorney, Agent, or Firm* — Kilpatrick Townsend & Stockton LLP

(57) ABSTRACT

Described are balls, in particular a football, and a method for its manufacture. The ball comprises particles of an expanded material. As examples, the particles are connected, at least partially, to each other by radio frequency welding and/or infrared welding. As examples, the ball has a first layer of the particles of the expanded material, wherein the first layer is provided as an outer shell.

15 Claims, 10 Drawing Sheets

(51) Int. Cl.
  *B29C 41/04* (2006.01)
  *B29C 41/20* (2006.01)
  *B29L 31/54* (2006.01)
  *B29C 41/22* (2006.01)

(56) References Cited

U.S. PATENT DOCUMENTS

| | | | |
|---|---|---|---|
| 2,131,756 A | 10/1938 | Roberts | |
| 2,525,965 A * | 10/1950 | Smith | C08J 9/06 |
| | | | 261/DIG. 72 |
| 2,968,106 A | 1/1961 | Joiner et al. | |
| 3,186,013 A | 6/1965 | Glassman et al. | |
| 3,508,750 A | 4/1970 | Henderson | |
| 3,586,003 A | 6/1971 | Baker | |
| D237,323 S | 10/1975 | Inohara | |
| 4,070,434 A * | 1/1978 | Noda | B29C 41/003 |
| | | | 137/223 |
| 4,132,016 A | 1/1979 | Vaccari | |
| 4,154,789 A * | 5/1979 | Delacoste | A63B 41/00 |
| | | | 264/138 |
| 4,238,537 A * | 12/1980 | Kerr | A63B 37/02 |
| | | | 264/310 |
| 4,364,189 A | 12/1982 | Bates | |
| 4,462,590 A * | 7/1984 | Mitchell | A63B 41/08 |
| | | | 273/DIG. 8 |
| 4,463,951 A * | 8/1984 | Kumasaka | A63B 37/02 |
| | | | 273/DIG. 5 |
| 4,481,727 A | 11/1984 | Stubblefield et al. | |
| 4,524,529 A | 6/1985 | Schaefer | |
| 4,546,559 A | 10/1985 | Dassler et al. | |
| 4,624,062 A | 11/1986 | Autry | |
| 4,642,911 A | 2/1987 | Talarico et al. | |
| 4,658,515 A | 4/1987 | Oatman et al. | |
| 4,667,423 A | 5/1987 | Autry et al. | |
| D296,262 S | 6/1988 | Brown et al. | |
| 4,754,561 A | 7/1988 | Dufour | |
| D302,898 S | 8/1989 | Greenberg | |
| 4,861,028 A * | 8/1989 | Williams | A63B 37/06 |
| | | | 273/DIG. 20 |
| RE33,066 E | 9/1989 | Stubblefield | |
| 4,864,739 A | 9/1989 | Maestri | |
| 4,922,631 A | 5/1990 | Anderie | |
| 4,943,055 A | 7/1990 | Corley | |
| 4,956,234 A * | 9/1990 | Morales | A63B 41/00 |
| | | | 264/45.7 |
| 4,970,807 A | 11/1990 | Anderie et al. | |
| 4,980,445 A | 12/1990 | van Der wal et al. | |
| 5,025,573 A | 6/1991 | Giese et al. | |
| 5,123,659 A * | 6/1992 | Williams | A63B 37/0098 |
| | | | 264/46.9 |
| D329,731 S | 9/1992 | Adcock et al. | |
| 5,150,490 A | 9/1992 | Busch et al. | |
| 5,181,717 A * | 1/1993 | Donntag | A63B 41/08 |
| | | | 264/257 |
| D333,556 S | 3/1993 | Purdom | |
| D337,650 S | 7/1993 | Thomas, III et al. | |
| D340,797 S | 11/1993 | Pallera et al. | |
| 5,283,963 A | 2/1994 | Lerner et al. | |
| 5,308,420 A | 5/1994 | Yang et al. | |
| 5,319,866 A | 6/1994 | Foley et al. | |
| D350,016 S | 8/1994 | Passke et al. | |
| D350,222 S | 9/1994 | Hase | |
| D356,438 S | 3/1995 | Opie et al. | |
| 5,549,743 A | 8/1996 | Pearce | |
| D375,619 S | 11/1996 | Backus et al. | |
| 5,580,049 A * | 12/1996 | Brantley | A63B 41/08 |
| | | | 273/DIG. 8 |
| 5,617,650 A | 4/1997 | Grim | |
| 5,649,701 A * | 7/1997 | Mills | A63B 41/08 |
| | | | 156/147 |
| 5,692,319 A | 12/1997 | Parker et al. | |
| 5,709,954 A | 1/1998 | Lyden et al. | |
| D389,991 S | 2/1998 | Elliott | |
| D390,349 S | 2/1998 | Murai et al. | |
| D393,340 S | 4/1998 | Doxey | |
| D395,337 S | 6/1998 | Greene | |
| 5,865,697 A | 2/1999 | Molitor et al. | |
| D408,618 S | 4/1999 | Wilborn et al. | |
| D408,971 S | 5/1999 | Birkenstock | |
| D413,010 S | 8/1999 | Birkenstock | |
| 5,932,336 A | 8/1999 | Petrovic et al. | |
| D414,920 S | 10/1999 | Cahill | |
| D415,610 S | 10/1999 | Cahill | |
| D415,876 S | 11/1999 | Cahill | |
| 5,996,252 A | 12/1999 | Cougar | |
| 6,014,821 A | 1/2000 | Yaw | |
| 6,024,661 A * | 2/2000 | Guenther | A63B 41/08 |
| | | | 473/599 |
| 6,041,521 A | 3/2000 | Wong | |
| D422,400 S | 4/2000 | Brady et al. | |
| D423,199 S | 4/2000 | Cahill | |
| 6,102,815 A * | 8/2000 | Sutherland | A63B 37/0003 |
| | | | 473/371 |
| 6,106,419 A | 8/2000 | Hall et al. | |
| 6,108,943 A | 8/2000 | Hudson | |
| D431,346 S | 10/2000 | Birkenstock | |
| 6,206,795 B1 * | 3/2001 | Ou | A63B 41/08 |
| | | | 473/599 |
| 6,302,815 B1 * | 10/2001 | Shishido | A63B 41/08 |
| | | | 473/598 |
| 6,306,054 B1 * | 10/2001 | Dobrounig | A63B 41/08 |
| | | | 473/599 |
| D460,852 S | 7/2002 | Daudier | |
| 6,516,540 B2 | 2/2003 | Seydel et al. | |
| 6,702,469 B1 | 3/2004 | Taniguchi et al. | |
| D490,222 S | 5/2004 | Burg et al. | |
| D490,230 S | 5/2004 | Mervar | |
| D492,099 S | 6/2004 | McClaskie | |
| 6,782,640 B2 | 8/2004 | Westin et al. | |
| 6,796,056 B2 | 9/2004 | Swigart | |
| D498,901 S | 11/2004 | Hawker et al. | |
| 6,849,667 B2 | 2/2005 | Haseyama et al. | |
| 6,874,257 B2 | 4/2005 | Erickson | |
| 6,925,734 B1 | 8/2005 | Schaeffer et al. | |
| 6,948,263 B2 | 9/2005 | Covatch | |
| 6,957,504 B2 | 10/2005 | Morris | |
| D517,302 S | 3/2006 | Ardissono | |
| 7,073,277 B2 | 7/2006 | Erb et al. | |
| 7,143,529 B2 | 12/2006 | Robinson et al. | |
| D538,518 S | 3/2007 | Della Valle | |
| 7,202,284 B1 | 4/2007 | Limerkens et al. | |
| D554,848 S | 11/2007 | Marston | |
| D560,883 S | 2/2008 | McClaskie | |
| D561,433 S | 2/2008 | McClaskie | |
| D561,438 S | 2/2008 | Belley | |
| D561,986 S | 2/2008 | Horne et al. | |
| D570,581 S | 6/2008 | Polegato | |
| D571,085 S | 6/2008 | McClaskie | |
| D572,462 S | 7/2008 | Hatfield et al. | |
| 7,421,805 B2 | 9/2008 | Geer | |
| D586,090 S | 2/2009 | Turner et al. | |
| D589,690 S | 4/2009 | Truelsen | |
| D594,187 S | 6/2009 | Hickman | |
| D596,384 S | 7/2009 | Andersen et al. | |
| D601,333 S | 10/2009 | McClaskie | |
| D606,733 S | 12/2009 | McClaskie | |
| D607,190 S | 1/2010 | McClaskie | |
| 7,648,434 B2 * | 1/2010 | Nagao | A63B 39/06 |
| | | | 473/604 |
| D611,233 S | 3/2010 | Della Valle et al. | |
| 7,673,397 B2 | 3/2010 | Jarvis | |
| D616,183 S | 5/2010 | Skaja | |
| D617,540 S | 6/2010 | McClaskie | |
| 7,740,551 B2 | 6/2010 | Nurnberg et al. | |
| D618,891 S | 7/2010 | McClaskie | |
| 7,854,815 B2 * | 12/2010 | Taniguchi | A63B 41/08 |
| | | | 156/146 |
| 7,867,115 B2 | 1/2011 | Zawitz et al. | |
| D631,646 S | 2/2011 | Müller | |
| D633,286 S | 3/2011 | Skaja | |
| D633,287 S | 3/2011 | Skaja | |
| D634,918 S | 3/2011 | Katz et al. | |
| D636,156 S | 4/2011 | Della Valle et al. | |

(56) References Cited

U.S. PATENT DOCUMENTS

| | | | |
|---|---|---|---|
| D636,569 S | 4/2011 | McMillan | |
| D636,571 S | 4/2011 | Avar | |
| 7,941,941 B2 | 5/2011 | Hazenberg et al. | |
| D641,142 S | 7/2011 | Lindseth et al. | |
| D644,827 S | 9/2011 | Lee | |
| D645,649 S | 9/2011 | McClaskie | |
| D648,105 S | 11/2011 | Schlageter et al. | |
| D650,159 S | 12/2011 | Avar | |
| 8,082,684 B2 | 12/2011 | Munns | |
| D655,488 S | 3/2012 | Blakeslee | |
| D659,364 S | 5/2012 | Jolicoeur | |
| 8,186,081 B2 | 5/2012 | Wilson, III | |
| 8,251,846 B2* | 8/2012 | Krysiak | A63B 41/08 473/597 |
| 8,282,851 B2* | 10/2012 | Duwenhorst | C08G 18/2027 252/62.53 |
| 8,382,619 B2* | 2/2013 | Bulfin | A63B 41/08 156/147 |
| D680,725 S | 4/2013 | Avar et al. | |
| D680,726 S | 4/2013 | Propét | |
| D683,116 S | 5/2013 | Petrie | |
| 8,479,412 B2 | 7/2013 | Peyton et al. | |
| 8,490,297 B2 | 7/2013 | Guerra | |
| D693,553 S | 11/2013 | McClaskie | |
| D695,501 S | 12/2013 | Yehudah | |
| 8,617,011 B2* | 12/2013 | Berggren | A63B 41/08 473/596 |
| D698,137 S | 1/2014 | Carr | |
| D707,934 S | 7/2014 | Petrie | |
| D709,680 S | 7/2014 | Herath | |
| 8,777,787 B2 | 7/2014 | McNamee et al. | |
| 8,834,770 B2 | 9/2014 | Nakano et al. | |
| D721,478 S | 1/2015 | Avent et al. | |
| 8,991,033 B1* | 3/2015 | Hussain | A63B 41/02 29/527.1 |
| 9,010,157 B1 | 4/2015 | Podhajny et al. | |
| D739,129 S | 9/2015 | Del Biondi | |
| D739,131 S | 9/2015 | Del Biondi | |
| D740,003 S | 10/2015 | Herath | |
| D740,004 S | 10/2015 | Hoellmueller et al. | |
| 9,212,270 B2 | 12/2015 | Künkel et al. | |
| D758,056 S | 6/2016 | Herath et al. | |
| D776,410 S | 1/2017 | Herath et al. | |
| D783,264 S | 4/2017 | Hoellmueller et al. | |
| 9,610,746 B2 | 4/2017 | Wardlaw et al. | |
| 9,781,970 B2 | 10/2017 | Angus et al. | |
| 9,781,974 B2 | 10/2017 | Reinhardt | |
| 9,788,598 B2 | 10/2017 | Reinhardt | |
| 9,788,606 B2 | 10/2017 | Reinhardt | |
| 9,820,528 B2 | 11/2017 | Reinhardt et al. | |
| 9,849,645 B2 | 12/2017 | Wardlaw et al. | |
| 10,259,183 B2 | 4/2019 | Wardlaw et al. | |
| 2003/0131501 A1 | 7/2003 | Erickson et al. | |
| 2003/0158275 A1 | 8/2003 | McClelland et al. | |
| 2003/0172548 A1 | 9/2003 | Fuerst | |
| 2003/0208925 A1 | 11/2003 | Pan | |
| 2003/0228946 A1* | 12/2003 | Chan | A63B 41/00 473/604 |
| 2004/0032042 A1 | 2/2004 | Chi | |
| 2004/0138318 A1 | 7/2004 | McClelland et al. | |
| 2004/0171765 A1* | 9/2004 | Tsuji | C08G 18/0895 525/452 |
| 2004/0211088 A1 | 10/2004 | Volkart | |
| 2005/0065270 A1 | 3/2005 | Knoerr et al. | |
| 2005/0108898 A1 | 5/2005 | Jeppesen et al. | |
| 2005/0150132 A1 | 7/2005 | Iannacone | |
| 2005/0241181 A1 | 11/2005 | Cheng | |
| 2005/0277499 A1* | 12/2005 | Tang | A63B 41/085 473/604 |
| 2006/0010717 A1 | 1/2006 | Finkelstein et al. | |
| 2006/0026863 A1 | 2/2006 | Liu | |
| 2006/0046880 A1* | 3/2006 | Tang | A63B 41/08 473/604 |
| 2006/0079645 A1* | 4/2006 | Hasegawa | C08L 43/04 525/191 |
| 2006/0083912 A1 | 4/2006 | Park et al. | |
| 2006/0084536 A1* | 4/2006 | Taniguchi | A63B 41/00 473/605 |
| 2006/0125134 A1 | 6/2006 | Lin et al. | |
| 2006/0134351 A1 | 6/2006 | Greene et al. | |
| 2006/0156579 A1 | 7/2006 | Hoffer et al. | |
| 2006/0235095 A1 | 10/2006 | Leberfinger et al. | |
| 2006/0283046 A1 | 12/2006 | Mason | |
| 2007/0117662 A1* | 5/2007 | Ma | A63B 41/00 473/604 |
| 2007/0193070 A1 | 8/2007 | Bertagna et al. | |
| 2007/0197317 A1* | 8/2007 | Lin | A63B 41/08 473/569 |
| 2007/0199213 A1 | 8/2007 | Campbell et al. | |
| 2007/0295451 A1 | 12/2007 | Willis | |
| 2008/0047538 A1 | 2/2008 | Gan | |
| 2008/0052965 A1 | 3/2008 | Sato et al. | |
| 2008/0060221 A1 | 3/2008 | Hottinger et al. | |
| 2008/0244932 A1 | 10/2008 | Nau et al. | |
| 2008/0250666 A1 | 10/2008 | Votolato | |
| 2009/0013558 A1 | 1/2009 | Hazenberg et al. | |
| 2009/0025260 A1 | 1/2009 | Nakano | |
| 2009/0113758 A1 | 5/2009 | Nishiwaki et al. | |
| 2009/0119023 A1 | 5/2009 | Zimmer et al. | |
| 2009/0235557 A1 | 9/2009 | Christensen et al. | |
| 2009/0277047 A1 | 11/2009 | Polegato | |
| 2009/0286629 A1* | 11/2009 | Petrichko | A63B 37/0044 473/378 |
| 2009/0286632 A1* | 11/2009 | Laliberty | A63B 41/00 473/603 |
| 2009/0320330 A1 | 12/2009 | Borel et al. | |
| 2010/0063778 A1 | 3/2010 | Schrock et al. | |
| 2010/0122472 A1 | 5/2010 | Wilson, III et al. | |
| 2010/0144470 A1* | 6/2010 | Lin | A63B 41/08 473/605 |
| 2010/0154257 A1 | 6/2010 | Bosomworth et al. | |
| 2010/0218397 A1 | 9/2010 | Nishiwaki et al. | |
| 2010/0222442 A1* | 9/2010 | Prissok | C08G 18/4854 521/60 |
| 2010/0240479 A1* | 9/2010 | Raynak | A63B 41/08 473/604 |
| 2010/0242309 A1 | 9/2010 | McCann | |
| 2010/0287788 A1 | 11/2010 | Spanks et al. | |
| 2010/0287795 A1 | 11/2010 | Van Niekerk | |
| 2010/0293811 A1 | 11/2010 | Truelsen | |
| 2011/0047720 A1 | 3/2011 | Maranan et al. | |
| 2011/0067272 A1 | 3/2011 | Lin | |
| 2011/0232135 A1 | 9/2011 | Dean et al. | |
| 2011/0252668 A1 | 10/2011 | Chen | |
| 2011/0283560 A1 | 11/2011 | Portzline et al. | |
| 2011/0302805 A1 | 12/2011 | Vito | |
| 2012/0005920 A1 | 1/2012 | Alvear et al. | |
| 2012/0047770 A1 | 3/2012 | Dean et al. | |
| 2012/0059075 A1 | 3/2012 | Prissok et al. | |
| 2012/0177777 A1 | 7/2012 | Brown et al. | |
| 2012/0231908 A1* | 9/2012 | Fujikura | A63B 41/08 473/607 |
| 2012/0233877 A1 | 9/2012 | Swigart | |
| 2012/0233883 A1 | 9/2012 | Spencer et al. | |
| 2012/0235322 A1 | 9/2012 | Greene et al. | |
| 2012/0266490 A1 | 10/2012 | Atwal et al. | |
| 2012/0297513 A1* | 11/2012 | Prissok | B29C 44/5627 2/2.15 |
| 2013/0150468 A1 | 6/2013 | Füssi et al. | |
| 2013/0227861 A1* | 9/2013 | Prissok | B29D 35/00 36/25 R |
| 2013/0255103 A1 | 10/2013 | Dua et al. | |
| 2013/0266792 A1 | 10/2013 | Nohara et al. | |
| 2013/0269215 A1 | 10/2013 | Smirman et al. | |
| 2013/0291409 A1 | 11/2013 | Reinhardt et al. | |
| 2014/0017450 A1 | 1/2014 | Baghdadi et al. | |
| 2014/0033573 A1 | 2/2014 | Wills | |
| 2014/0066530 A1 | 3/2014 | Shen et al. | |
| 2014/0075787 A1 | 3/2014 | Cartagena | |
| 2014/0194226 A1* | 7/2014 | Sullivan | A63B 37/0056 473/375 |

(56) References Cited

U.S. PATENT DOCUMENTS

| | | | |
|---|---|---|---|
| 2014/0197253 A1 | 7/2014 | Lofts et al. | |
| 2014/0213396 A1* | 7/2014 | McNamee | A63B 41/08 473/603 |
| 2014/0223673 A1 | 8/2014 | Wardlaw et al. | |
| 2014/0223776 A1 | 8/2014 | Wardlaw et al. | |
| 2014/0223777 A1 | 8/2014 | Whiteman et al. | |
| 2014/0223783 A1 | 8/2014 | Wardlaw et al. | |
| 2014/0227505 A1 | 8/2014 | Schiller et al. | |
| 2014/0274504 A1 | 9/2014 | Hu et al. | |
| 2014/0364251 A1* | 12/2014 | Sullivan | A63B 37/0003 473/374 |
| 2014/0366403 A1 | 12/2014 | Reinhardt et al. | |
| 2014/0366404 A1 | 12/2014 | Reinhardt et al. | |
| 2014/0366405 A1 | 12/2014 | Reinhardt et al. | |
| 2014/0373392 A1 | 12/2014 | Cullen | |
| 2015/0031482 A1* | 1/2015 | Frank | A63B 43/002 473/597 |
| 2015/0082668 A1 | 3/2015 | Nakaya et al. | |
| 2015/0089841 A1 | 4/2015 | Smaldone et al. | |
| 2015/0157897 A1* | 6/2015 | Sullivan | A63B 37/0064 473/376 |
| 2015/0166270 A1 | 6/2015 | Buscher et al. | |
| 2015/0174808 A1 | 6/2015 | Rudolph et al. | |
| 2015/0196809 A1* | 7/2015 | Sullivan | A63B 37/0058 473/376 |
| 2015/0197617 A1* | 7/2015 | Prissok | C08J 9/35 521/137 |
| 2015/0237823 A1 | 8/2015 | Schmitt et al. | |
| 2015/0344661 A1 | 12/2015 | Spies et al. | |
| 2015/0351493 A1 | 12/2015 | Ashcroft et al. | |
| 2016/0037859 A1 | 2/2016 | Smith et al. | |
| 2016/0044992 A1 | 2/2016 | Reinhardt et al. | |
| 2016/0046751 A1 | 2/2016 | Spies et al. | |
| 2016/0121524 A1 | 5/2016 | Däschlein et al. | |
| 2016/0128426 A1 | 5/2016 | Reinhardt et al. | |
| 2016/0227876 A1 | 8/2016 | Le et al. | |
| 2016/0244583 A1 | 8/2016 | Keppeler | |
| 2016/0244584 A1 | 8/2016 | Keppeler | |
| 2016/0244587 A1 | 8/2016 | Gutmann et al. | |
| 2016/0278481 A1 | 9/2016 | Le et al. | |
| 2016/0295955 A1 | 10/2016 | Wardlaw et al. | |
| 2016/0302508 A1* | 10/2016 | Kormann | A43B 1/0063 |
| 2017/0051121 A1* | 2/2017 | Prissok | C08J 9/228 |
| 2017/0173910 A1 | 6/2017 | Wardlaw et al. | |
| 2017/0253710 A1 | 9/2017 | Smith et al. | |
| 2017/0259474 A1 | 9/2017 | Holmes et al. | |
| 2017/0326413 A1* | 11/2017 | Chuang | A63B 37/06 |
| 2017/0340067 A1 | 11/2017 | Dyckmans et al. | |
| 2017/0341325 A1 | 11/2017 | Le et al. | |
| 2017/0341326 A1 | 11/2017 | Holmes et al. | |
| 2017/0341327 A1 | 11/2017 | Le et al. | |
| 2018/0000197 A1 | 1/2018 | Wardlaw et al. | |
| 2018/0035755 A1 | 2/2018 | Reinhardt et al. | |
| 2018/0154598 A1 | 6/2018 | Kurtz et al. | |
| 2018/0206591 A1 | 7/2018 | Whiteman et al. | |
| 2018/0235310 A1 | 8/2018 | Wardlaw et al. | |
| 2018/0290349 A1 | 10/2018 | Kirupanantham et al. | |
| 2018/0303198 A1 | 10/2018 | Reinhardt et al. | |

FOREIGN PATENT DOCUMENTS

| | | |
|---|---|---|
| CN | 2511160 | 9/2002 |
| CN | 2796454 | 7/2006 |
| CN | 2888936 | 4/2007 |
| CN | 101107113 | 1/2008 |
| CN | 101190049 | 6/2008 |
| CN | 201223028 | 4/2009 |
| CN | 100506327 | 7/2009 |
| CN | 101484035 | 7/2009 |
| CN | 101611950 | 12/2009 |
| CN | 202233324 | 5/2012 |
| CN | 202635746 | 1/2013 |
| CN | 202907958 | 5/2013 |
| CN | 103371564 | 10/2013 |
| CN | 203692653 | 7/2014 |
| CN | 203828180 | 9/2014 |
| DE | 3605662 | 6/1987 |
| DE | 4236081 | 4/1994 |
| DE | 29718491 | 2/1998 |
| DE | 19652690 | 6/1998 |
| DE | 19950121 | 11/2000 |
| DE | 10010182 | 9/2001 |
| DE | 10244433 | 12/2005 |
| DE | 10244435 | 2/2006 |
| DE | 102004063803 | 7/2006 |
| DE | 10200505411 | 4/2007 |
| DE | 202008017042 | 4/2009 |
| DE | 102008020890 | 10/2009 |
| DE | 102009004386 | 7/2010 |
| DE | 202010008893 | 1/2011 |
| DE | 202010015777 | 1/2011 |
| DE | 112009001291 | 4/2011 |
| DE | 102010052783 | 5/2012 |
| DE | 202012005735 | 8/2012 |
| DE | 102011108744 | 1/2013 |
| DE | 102012206094 | 10/2013 |
| DE | 102013208170 | 11/2014 |
| EM | 001286116-0001 | 7/2011 |
| EM | 001286116-0002 | 7/2011 |
| EM | 001286116-0003 | 7/2011 |
| EM | 001286116-0004 | 7/2011 |
| EM | 001286116-0005 | 7/2011 |
| EM | 001286116-0006 | 7/2011 |
| EP | 0165353 | 12/1985 |
| EP | 752216 | 1/1997 |
| EP | 873061 | 10/1998 |
| EP | 1197159 | 4/2002 |
| EP | 1424105 | 6/2004 |
| EP | 1197159 | 9/2004 |
| EP | 1854620 | 11/2007 |
| EP | 1872924 | 1/2008 |
| EP | 2110037 A1 | 10/2009 |
| EP | 2233021 | 9/2010 |
| EP | 2250917 | 11/2010 |
| EP | 2316293 | 5/2011 |
| EP | 2342986 | 7/2011 |
| EP | 2446768 | 5/2012 |
| EP | 2649896 | 10/2013 |
| EP | 2540184 | 7/2014 |
| EP | 2792261 A1 | 10/2014 |
| EP | 2848144 | 3/2015 |
| EP | 2939558 | 11/2015 |
| EP | 3067100 | 9/2016 |
| ES | 1073997 | 6/2011 |
| FR | 2683432 | 5/1993 |
| GB | 2258801 | 2/1993 |
| GB | 2494131 | 1/2014 |
| JP | 58-040171 U | 3/1983 |
| JP | 62-038185 A | 2/1987 |
| JP | 01274705 | 11/1989 |
| JP | 04502780 A | 5/1992 |
| JP | 6046483 U | 6/1994 |
| JP | 10152575 | 11/1996 |
| JP | 2000197503 | 7/2000 |
| JP | 2002361749 | 12/2002 |
| JP | 2005218543 | 8/2005 |
| JP | 2007-503324 A | 2/2007 |
| JP | 2007516109 | 6/2007 |
| JP | 2008073548 | 4/2008 |
| JP | 2008-113838 A | 5/2008 |
| JP | 2008543401 | 12/2008 |
| KR | 1020110049293 | 5/2011 |
| TW | 201012407 | 4/2010 |
| WO | 8906501 | 7/1989 |
| WO | 1994020568 | 9/1994 |
| WO | 97/17109 | 5/1997 |
| WO | 2002/008322 | 1/2002 |
| WO | 2005023920 | 3/2005 |
| WO | 2005026243 | 3/2005 |
| WO | 2005/038706 | 4/2005 |
| WO | 2005066250 | 7/2005 |
| WO | 2006015440 | 2/2006 |
| WO | 2006027671 | 3/2006 |

(56) References Cited

FOREIGN PATENT DOCUMENTS

| WO | 2006/034807 A1 | 4/2006 |
|---|---|---|
| WO | 2006090221 | 8/2006 |
| WO | 2006/134033 A1 | 12/2006 |
| WO | 2007082638 | 7/2007 |
| WO | 2008047538 | 4/2008 |
| WO | 2008087078 | 7/2008 |
| WO | 2009039555 | 4/2009 |
| WO | 2009095935 | 8/2009 |
| WO | 2010010010 | 1/2010 |
| WO | 2010037028 | 4/2010 |
| WO | 2010045144 | 4/2010 |
| WO | 2010136398 | 12/2010 |
| WO | 2011134996 | 11/2011 |
| WO | 2012065926 | 5/2012 |
| WO | 2013013784 | 1/2013 |
| WO | 2013168256 | 11/2013 |
| WO | 2014046940 | 3/2014 |
| WO | 2015052265 | 4/2015 |
| WO | 2015052267 | 4/2015 |
| WO | 2015075546 | 5/2015 |

OTHER PUBLICATIONS

"http://www.britannica.com/print/article/463664", Aug. 17, 2016, 15 pgs.

Amesöder et al., "The right turn (part 1)—Determination of Characteristic values for assembly injection", Journal of Plastics Technology, Apr. 2008, pp. 1-8 (English Translation of Abstract provided).

Azo Materials, "BASF Develops Expanded Thermoplastic Polyurethane", available http://www.azom.com/news.aspx?NewsID=37360, Jul. 2, 2013, 4 pages.

Baub et al., "Saechtling Kunststoft Taschenbuch", Hanser Verlag, 31st Ausgabe, Oct. 2013, 16 pages (9 pages for the original document and 9 pages for the English translation).

German Patent Application No. 102015209795.1, Office Action, dated Apr. 4, 2016, 8 pages (No English translation available. A summary of the Office Action is provided in the Transmittal Letter submitted herewith).

Venable LLP, "Letter", dated Jan. 14, 2018, 6 pages.

U.S. Appl. No. 29/558,138, Hoellmueller et al., Unpublished (filed Mar. 15, 2016).

U.S. Appl. No. 15/078,043, Le et al., Unpublished (filed Mar. 23 2016).

U.S. Appl. No. 15/093,233, Wardlaw et al., Unpublished (filed Apr. 7, 2016).

U.S. Appl. No. 15/130,012, Kormann et al., Unpublished (filed Apr. 15, 2016).

U.S. Appl. No. 29/550,418, Galway et al., Unpublished (filed Jan. 4, 2016).

U.S. Appl. No. 62/137,139, Gordon et al., Unpublished (filed Mar. 23, 2016).

Extended European Search Report, European Patent Application No. 16171694.9, dated Oct. 20, 2016, 8 pages.

"Colour and Additive Preparations for Extruded Polyolefin Foams", Gabriel-Chemie Group, available at www.gabriel-chemie.com/downloads/folder/PE%20foams_en.pdf, last accessed on Jan. 17, 2017, 20 pages.

"http://www.dow.com/polyethylene/na/en/fab/foaming.htm", Dec. 7, 2011, 1 page.

Nauta, "Stabilisation of Low Density, Closed Cell Polyethylene Foam", University of Twente, Netherlands, 2000, 148 pages.

Third Party Submission, U.S. Appl. No. 14/981,168, dated Nov. 14, 2016, 44 pages.

Office Action, Chinese Patent Application No. 201610364789.8, dated Feb. 5, 2018, 14 pages.

U.S. Appl. No. 15/581,112, Unpublished (filed Apr. 28, 2017).
U.S. Appl. No. 15/703,031, Unpublished (filed Sep. 13, 2017).
U.S. Appl. No. 15/724,318, Unpublished (filed Oct. 4, 2017).
U.S. Appl. No. 29/591,016, Unpublished (filed Jan. 16, 2017).
U.S. Appl. No. 29/592,935, Unpublished (filed Feb. 3, 2017).
U.S. Appl. No. 29/592,946, Unpublished (filed Feb. 3, 2017).
U.S. Appl. No. 29/594,228, Unpublished (filed Feb. 16, 2017).
U.S. Appl. No. 29/594,358, Unpublished (filed Feb. 17, 2017).
U.S. Appl. No. 29/595,852, Unpublished (filed Mar. 2, 2017).
U.S. Appl. No. 29/595,857, Unpublished (filed Mar. 2, 2017).
U.S. Appl. No. 29/595,859, Unpublished (filed Mar. 2, 2017).
U.S. Appl. No. 29/614,532, Unpublished (filed Aug. 21, 2017).
U.S. Appl. No. 29/614,545, Unpublished (filed Aug. 21, 2017).
U.S. Appl. No. 62/137,139, Unpublished (filed Mar. 23, 2016).

Office Action, German Patent Application No. 10 2015 209 795.1, dated Dec. 5, 2018, 4 pages.

Office Action, Japanese Patent Application No. 2016-105715, dated Jun. 19, 2018, 21 pages.

U.S. Appl. No. 29/664,097, filed Sep. 21, 2018, Unpublished.
U.S. Appl. No. 16/353,374, filed Mar. 14, 2019, Unpublished.
U.S. Appl. No. 29/663,342, filed Sep. 13, 2018, Unpublished.
U.S. Appl. No. 29/691,166, filed May 14, 2019, Unpublished.
U.S. Appl. No. 29/641,223, filed Mar. 20, 2018, Unpublished.
U.S. Appl. No. 29/641,371, filed Mar. 21, 2018, Unpublished.
U.S. Appl. No. 29/641,256, filed Mar. 20, 2018, Unpublished.
U.S. Appl. No. 29/663,029, filed Sep. 11, 2018, Unpublished.
U.S. Appl. No. 16/139,797, filed Sep. 24, 2018, Unpublished.
U.S. Appl. No. 29/691,854, filed May 20, 2019, Unpublished.
U.S. Appl. No. 29/679,962, filed Feb. 12, 2019, Unpublished.

Office Action, Japanese Patent Application No. 2019-138734, dated May 19, 2020, 8 pages.

Office Action, Chinese Patent Application No. 201610364789.8, dated May 24, 2019, 13 pages.

Office Action, Japanese Patent Application No. 2019-138734, dated Oct. 6, 2020, 10 pages.

* cited by examiner

BALL AND METHOD FOR ITS MANUFACTURE

CROSS REFERENCE TO RELATED APPLICATION

This application is related to and claims priority benefits from German Patent Application No. DE 10 2015 209 795.1, filed on May 28, 2015, entitled Ball and Method for its Manufacture ("the '795 application"). The '795 application is hereby incorporated herein in its entirety by this reference.

FIELD OF THE INVENTION

The present invention relates to a ball, in particular a football, and a method for its manufacture.

BACKGROUND

Balls, such as footballs, basketballs or game balls for children of different construction as well as various methods for their manufacture are known from the prior art.

With regard to a material with good rebound properties, the website http://www.azom.com/news-.aspx?NewsID=37360 mentions a new expanded thermoplastic polyurethane material. The website mentions that tests under ISO 8307 (the ball rebound test) and under DIN 53512 show a rebound height as much as about 55 percent.

With regard to different ball constructions, solid balls made of foamed material are available on the market as game balls for children and are also mentioned in patent specifications. CN 100506327 C discloses a solid, elastic ball with a core made of foamed polyurethane material. U.S. Pat. No. 4,943,055 A discloses a ball for warming-up exercises, which comprises a metal core to increase the weight of the ball, an outer layer, and an intermediate layer containing a filling material, for example a polymer such as polyurethane.

U.S. Pat. Nos. 3,508,750 A and 8,777,787 B2 disclose ball constructions using ball panels. More specifically, U.S. Pat. No. 3,508,750 A discloses a ball for a game in which a plurality of ball panels are glued onto a carcass. U.S. Pat. No. 8,777,787 B2 discloses a sports ball that may include a casing, an intermediate layer, and a bladder. In manufacturing the sport ball, a panel element of the casing and the bladder may be located in a mold, and a polymer foam material of the intermediate layer may be injected into an area between the bladder and the panel element. In addition, edges of panel element may be heat bonded to each other to join the panel elements and form seams of the casing.

Further ball constructions are known from the publications U.S. Pat. No. 5,865,697 A, GB 2,494,131 B, U.S. Pat. No. 7,867,115 B2 and U.S. Pat. No. 7,740,551 B2. U.S. Pat. No. 5,865,697 A discloses a sports ball in which an intermediate layer with an elastomer material is arranged in a waffle-like arrangement between an outer layer of the ball and a bladder. GB 2,494,131 B discloses an inflatable ball with a first and a second half, wherein each half comprises reinforcing ribs either on an inner or outer wall and one half comprises a hole with a valve unit. U.S. Pat. No. 7,867,115 B2 discloses toy balls with a light assembly comprised of a power source and a plurality of LEDs and a spherical skeletal structure comprising a plurality of segments. Finally, U.S. Pat. No. 7,740,551 B2 discloses a bladder for an inflatable ball, the bladder including a structure for receiving an electronic component.

U.S. Pat. No. 6,106,419 A and WO 97/17109 A1 relate to a ball for use in playing games, especially to a pressureless ball, such as a pressureless tennis ball.

A disadvantage of some of the balls known from the prior art is that the processing cycle for their manufacture is complicated and long. Also, the surfaces of the balls according to the prior art may significantly deteriorate with time. The surface of conventional ball panels, or seams between the panels, may, for example, become brittle. This can lead to a decrease in their tear strength such that the balls can lose their shape and/or allow too much ingress of water into the material of the ball again decreasing their shape stability and leading to a deterioration of their physical properties. In addition, a further disadvantage of known balls is that they may lose their elasticity, in particular at low temperatures, or they need to be repeatedly inflated to maintain the desired in-use properties.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a ball comprises particles of an expanded material. In some embodiments, the particles are connected to each other by fusing at their surfaces. The particles may be connected, at least partially, by radio frequency welding and/or infrared welding.

In certain embodiments, a plastic coating and/or a plastic foil material is arranged on an outward facing surface of the ball, and wherein the outward facing surface of the ball and/or the plastic coating and/or the plastic foil material comprises a textured surface.

The ball may further comprise at least a first layer of the particles of the expanded material, wherein the first layer is provided as an outer shell.

The ball may also further comprise a plurality of layers, wherein the plurality of layers comprising the particles of the expanded material.

In some embodiments, at least one of a thickness of the plurality of layers, a composition of a material of the plurality of layers, and at least one process parameter for the manufacture of the plurality of layers vary between at least one of the plurality of layers.

According to some embodiments, the first layer comprises a plurality of ball panels with the particles of the expanded material.

The ball may further comprise at least one cavity, wherein the first layer is arranged around the at least one cavity.

The first layer may be arranged on a ball carcass which surrounds the at least one cavity. In certain embodiments, the ball carcass comprises an inflatable bladder.

The ball may further comprise a supporting structure with the particles of the expanded material. In some embodiments, the supporting structure comprises at least one of: a wall extending within at least one cavity, a bar extending within the at least one cavity, and an inner shell extending within the at least one cavity. In further embodiments, the supporting structure comprises at least one region with a repeated 3D structure. In certain embodiments, the supporting structure comprises at least one rotational symmetry for a rotation by a symmetry angle (☐) around a symmetry axis running through a center of the ball.

According to some embodiments, the first layer and/or the supporting structure define at least one chamber, and wherein the at least one chamber is filled with at least one gas at above ambient pressure. At least a part of the first layer and at least a part of the supporting structure may be integrally manufactured as a single piece.

In some embodiments, the ball is a solid ball.

According to certain embodiments of the present invention, a method for the manufacture of a ball comprising particles of an expanded material, the method comprising connecting the particles of the expanded material by radio frequency welding and/or infrared welding.

According to certain embodiments of the present invention, a method for the manufacture of a ball comprising particles of an expanded material, the method comprising loading the particles of the expanded material into a rotational mold and rotationally molding at least a part of the ball.

BRIEF DESCRIPTION OF THE DRAWINGS

In the following detailed description, embodiments of the invention are described referring to the following figures:

FIG. 2b is a partial perspective view of the ball of FIG. 2a.

FIG. 2c is another partial perspective view of the ball of FIG. 2a.

FIG. 2d is an exploded view of the ball of FIG. 2a.

BRIEF DESCRIPTION

Figure 1A:
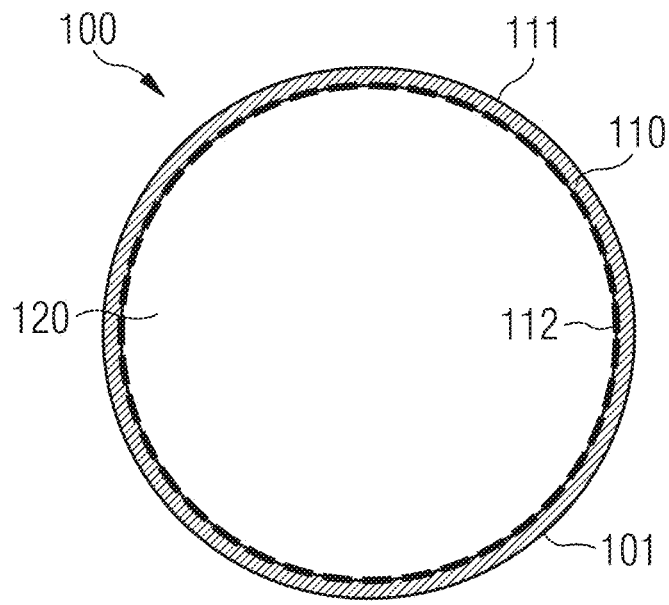
FIGS. 1a-i are cross-sectional views of various embodiments of a ball, according to certain embodiments of the present invention.

It is therefore an objective of the present invention to provide improved balls like footballs or the like, which avoid or reduce at least some of the disadvantages of the prior art. In particular, the balls should comprise good elastic properties, even at low or high temperatures and maintain a high quality, both with respect to the physical properties and their appearance, over a long period of time. Furthermore, the complexity of ball manufacture should be minimized. The manufacture should also allow adjustment of the properties of the balls to the respective requirements dictated by use, in terms of weight, surface texture, aerodynamic properties, etc.

These problems are at least partially solved by a ball for a game according to claim 1. In an embodiment, a ball, in particular a football, comprises particles of an expanded material.

The use of particles of expanded material can be advantageous in several respects. Firstly, the use of such particles can improve the abrasion resistance and the tear strength of the ball and in particular its surface. Secondly, a ball with such particles can have good elastic properties, which may even be (essentially) maintained at low temperatures, for example, at temperatures below 0° C. (e.g. in the temperature range from −40° C. to 0° C.), and at high temperatures, for example temperatures above 20° C. (e.g. temperatures in the range from 20° C. to 45° C.).

The expanded material may comprise at least one of the following materials: expanded thermoplastic polyurethane (eTPU), expanded polyetherblockamide (ePEBA), expanded polyamide (ePA), expanded polypropylene (ePP), expanded polystyrene (ePS), expanded ethylene-vinyl-acetate (eEVA).

Particles from these expanded materials are well suited for the use in a ball according to the invention as they can have a low weight and very good elastic properties, which they may also maintain at low or high temperatures (e.g. in the temperature ranges mentioned directly above). Furthermore, they may exhibit a comparatively high energy return following compression and subsequent re-expansion, thus, contributing to particularly good bouncing properties of the ball. Their use may contribute to providing a ball with high tear-strength and abrasion resistance, in particular at its surface.

The skilled person will understand that the individual particles of the ball can comprise different mixtures or combinations of these materials. Hence, the material composition of the individual particles may vary across the ball or across different regions or parts of the ball. This may be useful, for example, when attempting to locally influence the properties of the ball during its manufacture.

The ball may further comprise additional expanded or non-expanded materials, like plastic materials, textile materials, metal wires, leather, and so forth.

The particles may be connected to each other. The particles may in particular be fused at their surfaces. The particles may be fused at their surfaces by subjecting them to heat, for example in the form of (pressurized) steam, and/or subjecting them to compression and heat.

The heat may also be provided via high frequency (HF) welding, for example radio frequency (RF) welding and/or infrared (IR) welding. That is, the particles may be connected to each other, at least partially, by means of RF welding and/or IR welding. "At least partially" can mean that these techniques may also be combined with other techniques to connect the particles.

The surfaces of the particles may, for example, by fused together using RF fusing.

The particles may also be connected to each other in a different manner alternatively or in addition, e.g. by use of a bonding agent or glue.

Moreover, the particles may be randomly arranged. This may significantly reduce the manufacturing effort since the particles need not be arranged in a specific pattern or arrangement within a manufacturing tool.

The particles may be arranged in a specific pattern. This may facilitate tailoring the properties of a section of the ball or the whole ball. For example, aligning the particles in a certain direction can provide isotropic properties. The particles may also be arranged in terms of size. For example, layers of smaller particles can be interspersed between layers of larger particles. The person skilled in the art will realize that this can also be used to tailor properties of the section or ball.

A plastic coating and/or a plastic foil material can be arranged on an outward facing surface of the ball.

A plastic coating or a plastic foil material on the outward facing surface of the ball (or in partial regions thereof) can increase the durability, abrasion resistance or tear-strength of the ball and in particular its outward facing surface. Also, a plastic coating or a plastic foil material can serve to influence the appearance of the ball. Influencing the feel and handling of the ball, for example the grip of the ball or its water-repellant properties, and influencing its aerodynamic properties is also possible in this manner.

The outward facing surface of ball and/or the plastic coating mentioned above and/or the plastic foil material mentioned above may comprise a textured surface.

A texture may advantageously influence the feel, handling and aerodynamics of the ball. For example, a surface that is too smooth may not only result in poor handling of the ball, but also lead to a ball that wobbles quite considerably during flight.

In embodiments where the outward facing surface of the ball is directly textured, a plastic coating or a plastic foil material may not be needed. However, in this case a plastic coating or a plastic foil material can be advantageously added, for example, to stabilize the texture, improve the appearance and/or to protect it against abrasion and other external influences.

The ball may comprise at least a first layer with the particles of the expanded material. The first layer may in particular be provided as an outer shell of the ball.

Reference is made to the fact that the statement that the first layer comprises the particles of the expanded material does not mean that other parts of the ball may not also comprise the particles of the expanded material. The particles of the expanded material may also be part of other parts of the ball, unless explicitly stated otherwise. Moreover, it is emphasized that the expanded material may be a different expanded material for different particles and may hence vary across different regions or parts of the ball, as already mentioned.

A first layer comprising particles of the expanded material provided as an outer shell can be well suited to increasing the durability of the outer shell, for example, through increased tear-strength and abrasion resistance.

The ball may comprise a plurality of layers, in particular a plurality of layers with the particles of the expanded material.

Of the plurality of layers, some or all layers may comprise the particles of the expanded material. Some layers may, however, also comprise different materials, for example, non-expanded plastic materials or textile materials, metal wires, etc. This enables influencing of the physical and mechanical properties of the ball independently and at different depths, thereby increasing the possibilities to tailor the ball to the desired needs and requirements for the manufacturing process or end user.

It is possible that the thickness of the layers and/or the composition of the material of the layers, in particular a composition of the expanded material of the particles, and/or at least one process parameter for the manufacture of the layers vary between at least one of the plurality of layers.

That is, the above-mentioned parameters (thickness, material composition of the (expanded) material, process parameters) can be varied within a given layer and/or between different layers.

In this manner e.g. the tear-strength, rebound properties, percentage energy return, density, etc. within a layer and/or of the different layers can independently be adjusted as desired during the manufacture.

The first layer may comprise a thickness in the range of 0.5 mm-10 mm, and may further comprise a thickness in the range of 1 mm-5 mm.

If, for example, the first layer is provided as an outer shell of the ball, a thickness in these ranges has proven to be an advantageous compromise between sufficient stability on the one hand and minimization of weight and thickness of material on the other hand. This compromise may be adjusted depending on the desired resultant properties desired for each ball. In an embodiment, a ball being entirely (or at least predominantly) comprised by an outer shell with such a thickness may thus be provided.

The thickness of the first layer may vary. The first layer may comprise different thicknesses in different regions. The thickness of the first layer may be graduated between thicker and thinner regions or vary locally. For example, the first layer may comprise one or more reinforcing bulges or struts, for example, on its inner side and, thus, increase the shape stability of the ball.

Varying the thickness of the first layer can again permit tailoring of the final properties of the ball to the desired use. Thicker regions can be used to increase the shape stability of the ball or alternatively, to modify the rebound or flight characteristics of the ball.

The first layer can comprise a plurality of ball panels with the particles of the expanded material. If the ball comprises more than one layer, also some or all of the additional layers may comprise ball panels, in particular ball panels with the particles.

The possibility of providing the first layer by using a plurality of ball panels may allow the balls to be manufactured in large numbers in series production since individual ball panels are suited for such mass production and can, for example, be handled automatically. The ball panels may be connected to each other mechanically, for example, glued or sewn together. However, it is also possible for the ball panels to be connected by way of the particles of expanded material being connected to each other directly. The particles on the contacting surfaces of two abutting ball panels may, for example, be directly welded together. As a result, the use of additional materials such as adhesives or seams can be reduced or avoided and a particularly durable and resistant connection can be achieved.

An individual ball panel may, for example, be manufactured by using RF and/or IR welding techniques, and these techniques may also be used to connect the panels together where they abut each other. For example, RF fusing techniques may be used in conjunction with ball panels as described here.

The ball may at least partially be manufacturable by assembling three-dimensionally pre-shaped ball panels.

By using three-dimensionally pre-shaped ball panels, the assembly of the panels can be significantly simplified as the ball panels do not have to be bent or deformed during the assembly or only to a minor extent. This can also help to avoid material distortions that could arise when initially flat ball panels have to be "curved" into their three-dimensional shape during assembly. Automatization of the production process may also be facilitated in this manner.

The ball may comprise at least one cavity, wherein the first layer is arranged around the cavity. If further layers are present, they may also be arranged around the cavity, for example between the first layer and the cavity.

In embodiments with one or more layers and a cavity, it is not mandatory for the first layer (and the potential additional layers) to comprise a closed surface which encompasses or encapsulates the cavity. Rather, the fact that the first layer is arranged around a cavity can merely mean that from the first layer inwards towards the center of the ball, the ball is not constructed completely solid, as can be the case in other embodiments of the invention. Further elements of the ball may extend into in the cavity, like an (elastic) supporting structure as described below. By having a cavity, a ball with a relatively low weight can be provided.

The first layer can be arranged on a ball carcass which surrounds the cavity. If further layers are present, these can be, for example, arranged between the carcass and the first layer. The carcass can also be sandwiched between two layers.

A ball carcass can serve to facilitate the manufacture of the first layer (or the plurality of layers). This is particularly so if the first layer is assembled from a plurality of separate parts, for example from a plurality of ball panels as described above. Furthermore, the carcass can also increase the stability of the ball.

The ball carcass may comprise an inflatable bladder.

An inflatable bladder can encompass the cavity in a manner essentially impermeable to gas. It may further allow adjusting the properties of the ball during use by inflating it or letting gas out of the bladder. The ball may comprise a valve unit through which the cavity within the inflatable bladder can be filled or emptied.

The cavity can in particular be filled with at least one gas at above ambient pressure.

In order to retain the pressurized gas within the cavity, the cavity should be encompassed by a closed surface that is essentially impermeable to gas. To this end, different possibilities are covered by the scope of the present invention: For example, the first layer may be provided with a closed surface which is essentially impermeable to gas. Additionally, or alternatively, a closed surface, which retains the gas in the cavity, can be arranged between the first layer and the cavity. Examples of such a closed surface arranged between the first layer and the cavity to retain the gas are a ball carcass and in particular an inflatable bladder. Filling the cavity with gas or gases like air or nitrogen can help to keep the resultant weight of the ball low. Filling the cavity with gas at above ambient pressure can furthermore serve to change and control the elastic- and rebound properties of the ball.

An inventive ball may comprise a supporting structure, in particular an elastic supporting structure, comprising the particles of the expanded material.

The stability of the ball can be increased by such a supporting structure. An elastic supporting structure can also serve to influence the properties of the ball, for example, the elasticity of the ball and its rebound properties. This is particularly true since the elastic supporting structure comprises particles of the expanded material, so that their good elastic properties may be passed onto the supporting structure.

Reference is made to the fact that such a supporting structure represents an independent aspect of the present invention and may thus also be used with conventional ball panels.

In general, the skilled person will understand that the different aspects, embodiments and design options described in this specification can be combined in an arbitrary manner (as long as physically possible) and therefore represent independent aspects of the invention.

As previously mentioned, the ball may comprise a cavity and the supporting structure may comprise at least one of: a wall extending within the cavity, a bar extending within the cavity, and an inner shell extending within the cavity.

Thus, while the ball does not comprise a completely solid core in such embodiments of the invention, it is still possible for elements of the supporting structure to extend within the cavity in order to increase the shape stability of the ball. Furthermore, the elastic properties of the ball can be further influenced by the (elastic) supporting structure.

The supporting structure may comprise at least one spherical inner shell.

One or more spherical inner shells can be connected by bars or walls with one another and also with the outer shell in order to provide a ball with a construction according to the "onion skin principle". By using spherical shells, an imbalance in the ball can be essentially avoided, so that the ball comprises approximately isotropic properties, i.e. properties invariant under any kind of rotation.

The supporting structure may comprise at least one region with a repeated 3d structure. That is, the supporting structure may comprise a repeated unit or unit cell and several of these unit cells are arranged next to each other to form the at least one region of the supporting structure. The several unit cells may each have the same 3d shape, but they may vary in their respective size. The supporting structure may, however, also comprise at least one region with a periodic 3d structure. In this case, the multiple unit cells arranged next to each other not only have the same 3d shape, but also the same size.

The unit cell may be a honeycomb. The unit cell may be sphere. The unit cell may be a cube. The unit cell may be a rectangular prism. The unit cell may be a triangular prism. The unit cell may be an octagonal prism. The unit cell may be a tetrahedron. The unit cell may be a square pyramid. The unit cell may be a cubic cylinder. The unit may be a cone. The person skilled in the art will realize a number of other alternative unit cells are possible to provide the same desired effect.

The supporting structure can even be entirely provided by a repeated/periodic 3d structure. Alternatively, only one or more partial regions of the supporting structure may comprise such a repeated/periodic 3d structure. It is possible, for example, that the supporting structure comprises an inner spherical shell and that the supporting structure is further provided as a repeated/periodic 3d structure between this inner shell and the outer shell. Herein, the repeated/periodic 3d structure can, on the one hand, be seen in a cross section of the ball, with the supporting structure (or the region with the repeated/periodic 3d structure) being provided in a tubular manner in a direction perpendicular to the cross-section. That is, the relevant part of the supporting structure may comprise a plurality of parallel running tubes, and a cross section perpendicular to the longitudinal axes of the tubes shows the repeated/periodic 3d structure. The tubes may be orientated to adjust the resulting properties of the ball. For example, the tubes may be arranged in a solely longitudinal direction. The difference in orientation can increase the shape stability of the ball or alternatively, modify the rebound or flight characteristics of the ball.

The supporting structure may comprise at least one rotational symmetry for a rotation by a symmetry angle α around a symmetry axis running through a center of the ball.

An object comprises or possesses a rotational symmetry for a rotation by a certain angle and around a certain axis if the object "looks the same" before and after that rotation. In other words, the object exhibits rotational symmetry under such a rotation.

Applied to the above statement about the (at least one) rotational symmetry of the supporting structure, this means that the supporting structure "looks the same" before and after a rotation about the angle α around the symmetry axis through the center of the ball.

The fact that the supporting structure comprises at least one rotation symmetry can prevent the ball from being significantly imbalanced by the supporting structure, which could negatively influence its properties. It is generally advantageous for the supporting structure to possess a high degree of symmetry. However, it may also be desirable for the supporting structure to only comprise a limited degree of symmetry or even no symmetry at all, e.g. in order to deliberately produce an imbalance in the ball. This could be desirable, for example, for a ball used for bowling or bowls, so that the ball can curve along its course.

The symmetry angle α may be one of 120°, 90°, 72°, 60° or a continuous rotation.

Such a 3-fold, 4-fold, 5-fold, 6-fold or continuous rotational symmetry has the advantage that a supporting structure provided in such a manner may at least approximately result in a ball comprising isotropic properties, i.e. properties invariant under rotations around the symmetry axis. Herein, the higher-fold the symmetry is, i.e. the smaller the symmetry angle α is, the higher this isotropy will generally be. However, this may increase the manufacturing costs, so that a suitable choice of a symmetry angle for the design of the supporting structure may be a compromise between invariable properties of the ball with respect to rotations on the one hand, and low manufacturing costs on the other hand.

The first layer and/or the supporting structure may define at least one chamber. The at least one chamber may be filled with at least one gas at above ambient pressure.

Such chambers can be defined by and be arranged within the first layer itself. This can help to further keep the weight low. Chambers may also be arranged within other layers of the ball and the chambers may even extend across several layers, if such additional layers are present. Furthermore, the chambers can also be defined by and be arranged within the supporting structure. For example, if a supporting structure according to the invention is used with conventional ball panels, chambers may be defined within the supporting structure. Finally, it is also possible for the chambers to be defined where the supporting structure meets the first layer (or some other layer).

Similar to an inflatable bladder, chambers filled with gas or gases (at above ambient pressure) may serve to influence and control the elastic properties of the ball, in particular its bouncing properties. As the supporting structure may further comprise a complex three-dimensional geometry, this control may even be possible to a more detailed level than for a simple inflatable bladder.

Adding chambers to a thick layer of a hollow ball can, for example, decrease the stiffness of the ball and reduce the rebound. Bigger chambers can make the ball weaker or less resilient than smaller chambers. Comparing identical chamber volumes, spherical chambers can produce a stiffer ball than other shapes. Smaller chambers can lead to a higher stiffness and/or a higher rebound since there is "more material" undergoing strain and work.

Spherical chambers can also lead to a higher stiffness and/or a higher rebound than, for example, chambers with a rectangular cross-section, since rectangular cross-sections may produce bucking and bending during deformation reducing efficiency of rebound. Chambers with pointy edges (pyramid, very flat rectangle, octahedron, etc.) may create stress concentrations and hence reduce the durability of the ball.

In the radial direction of the ball (in and out from the center), the chambers can be "tall" and "short". In the polar and/or azimuthal direction (i.e. in the surface direction), the chambers can be "wide" or "skinny" ("a big or a small piece of the pie"). If a chamber is very wide and tall, the ball can have an inconsistent bounce in height and direction. Very wide (and short) chambers can make the ball have soft spots where the chamber collapses.

Adding and removing chambers or placing them at different distances from the center of the ball can influence the ball's angular or rotational inertia. For the same weight, for example, if the chambers are bigger and/or closer to the outside of the ball, the rotational inertia will be lower. The spin rate of a flying ball with lower rotational inertia will decrease faster than the spin rate of a ball with higher rotational inertia. A football's spin rate decay, for example, influences the aerodynamic properties including but not limited to drag and swerving/curving characteristics. Changing the rotational inertia may also be noticeable in kicking/controlling the ball.

Compared to a conventional shell like ball, for example, an inventive ball with a thick first layer with or without chambers will have a lower rotational inertia for the same weight since more mass is shifted toward the geometric center of the ball. Reducing the rate of spin decay can then improve aerodynamic performance in swerve conditions since the onset of the reverse Magnus effect can be delayed with a lower spin rate decay. Therefore the ball could be less likely to straighten toward the end of its flight.

Moreover, the size and position of the chambers can be modified to help balancing out any valve, panel, or other masses that might otherwise make the ball unbalanced.

The walls of the chamber can be essentially impermeable to the gas.

Walls that are essentially impermeable to the gas allow the chambers to be filled with gas or gases at above ambient pressure and also allow this pressure to be maintained. Thus, repeated refilling of the chambers can be avoided.

At least a part of the first layer (or other layers adjacent to the supporting structure) and at least a part of the supporting structure can be integrally manufactured as a single piece.

A particularly close and resistant connection can be achieved by integrally manufacturing at least a part of the first layer and a part of the supporting structure as a single piece. Such an integral connection may be advantageous to create chambers that may be filled with a gas or gases and that are defined by the first layer and the supporting structure. The fact that both the first layer and the supporting structure may comprise particles of the expanded material may be advantageous here, as the surfaces of the particles can be directly connected, for example welded, to each other where the supporting structure meets the first layer to produce the integral connection.

The ball may also be a solid ball.

A solid ball may allow for a simple and fast production. Also, no inflation of the ball is necessary. By using the particles of the expanded material for the construction of the ball, the ball can still have the desired elasticity and bouncing properties. The ball may, of course, also comprise further materials in addition to the particles.

The ball may for example comprise a core of non-expanded material.

Such a core of non-expanded material may serve several purposes like, for example adjusting the weight of the ball, increasing its stability, influencing its elasticity.

The ball may not comprise an inflatable bladder.

As an example, due to the various possibilities for the design of the supporting structure mentioned in this specification, a ball may be provided without an inflatable bladder that still comprises the desired elastic properties. A ball which does not have to be inflated and yet permanently exhibits the desired properties can thus be provided.

A further aspect of the present invention relates to a method for the manufacture of a ball according to the invention.

Different manufacturing options will be described in the following in more detail. The skilled person will choose and/or combine from among these options the ones most suited for the manufacture of a specific embodiment of a ball according to the invention. Only exemplary applications of the described embodiments of an inventive method will therefore be briefly mentioned in the following and these examples may not be construed as limiting the field of application of the method.

The method may comprise connecting the particles of the expanded material by means of high frequency (HF) radiation. The method may, for example, comprise connecting the particles of the expanded material by means of radio frequency (RF) welding and/or infrared (IR) welding. In particular, the method may comprise fusing the surfaces of the particles by means of RF fusing.

Embodiments employing different electromagnetic radiation, or electromagnetic fields in general, for connecting the particles are also covered by the inventive method.

The method may comprise loading particles of an expanded material into a rotational mold and rotationally molding at least a part of the ball. The method may comprise the successive manufacture of a plurality of layers by rotational molding.

In this manner, a solid ball or a ball comprising one or several layers and potentially a central cavity may be manufactured.

The method may comprise the manufacture of a plurality of ball panels which comprise particles of an expanded material and which are assembled to at least partially form the ball.

The advantage of using ball panels in the manufacture of a ball has already been discussed.

The manufacture of an individual ball panel may comprise the steps of loading particles of the expanded material into a mold and compression molding of the particles within the mold.

The compression molding may (at least partially) be performed by a laser variothermal method. The variothermal method has heating and cooling channels that are placed in very close proximity to the surface of the mold. This results in the surface of the mold being able to be rapidly heated and cooled. The range of heating and cooling possible is 100 Kelvin in 20 seconds.

For example by employing such a variothermal method, the process cycle time for the manufacture of an individual ball panel before demolding of the panel may be less than 5 minutes and may further be less than 3 minutes.

This is advantageous as the decoupling (cycle) time for the manufacture of a part is significantly reduced.

The panel or panels may also be manufactured by connecting the particles by means of RF fusing, or some other method employing electromagnetic radiation, or such a method may contribute to the manufacture of a panel or panels. Furthermore, such a method may also be used to connect the panels (or at least some of them) to each other, as described above.

The manufacture of a ball panel may further comprise forming a first foil material within the mold prior to loading the particles into the mold. The forming of the first foil material within the mold may comprise vacuum forming/deep drawing of the first foil material.

Alternatively, the first foil material may be applied after forming a panel of the particles. For example, the mold may be loaded with the particles and the particles are compression molded to form a panel without a first foil material and only after the compression molding, the first foil material may be applied.

The first foil material may be located on the exterior side of the panels in the assembled ball and may hence influence the appearance and performance of the ball. The foil may, for example, increase the abrasion resistance of the panels and, therefore, of the ball or serve decorative purposes.

The compression molding may be performed at a temperature between 80° C. and 200° C., and may further be performed at a temperature between 100° C. and 180° C., and may still further be performed at a temperature between 135° C. and 145° C.

The temperature of the compression molding may be at or around the temperature at which the expanded material of the particles starts to melt. This may allow bonding the surfaces of the particles to each other without damaging the cell structure in the interior of the particles.

In addition to the numerous benefits already mentioned, a further significant advantage of the use of particles of expanded material can be a reduction in the process cycle time for the production of ball panels and hence also balls using such particles. Production efficiency and production output may thus be increased.

The method for the manufacture of a ball may further comprise applying a second foil material to some or all of the panels, in particular vacuum forming the second foil material over some or all of the panels.

A second foil material can be applied in addition to the first foil material. This may allow completely surrounding the panel by foil materials.

Alternatively or additionally, further layers of foil or coatings can be applied to the panel surface or onto the foil/coatings to form a multi-layer film. The different layers of the film may have different properties. The multi-layer film may include an abrasion resistant layer. The multi-layer film may include a UV resistant layer. The multi-layer film may include layers to modify optical properties of the surface.

It is also conceivable that the foil layers are not applied during processing of the panel during the mold but as spray coatings after the expanded particles have been formed into a panel.

The expanded material used in the method described above may comprise at least one of the following materials: expanded thermoplastic polyurethane (eTPU), expanded polyetherblockamide (ePEBA), expanded polyamide (ePA), expanded polypropylene (ePP), expanded polystyrene (ePS), expanded ethylene-vinyl-acetate (eEVA).

As already mentioned, the method may further comprise the application of a spray material, for example, onto an outward facing surface of the ball, in particular onto an outer surface of some or all of the ball panels.

Such a spray material may influence the appearance and performance of the ball. It may, for example, be used to apply decorations to the ball, it may be a water-repellant, it may increase the grip or abrasion resistance of the surface of the ball or it may beneficially influence its aerodynamic properties.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Possible embodiments of the present invention are described in the following detailed description, mainly in relation to footballs. However, emphasis is placed on the fact that the present invention is not limited to these embodiments. It will be obvious to the skilled person that the present invention may easily be applied to other types of balls, such as basketballs, balls for American football, tennis balls, volleyballs, baseballs, rugby balls, golf balls, bowling balls, toy balls, etc.

It is also to be noted that only some individual embodiments of the invention are described in greater detail below and that not all possible combinations and permutations of the different design options provided by the present invention can explicitly be discussed. However, it is clear to the person skilled in the art that the design options described in relation to the specific embodiments discussed below can also be further modified and can also be combined with each other in a different manner within the scope of the present invention. Individual features can also be omitted where they appear to be unnecessary. In order to avoid redundancies, reference is made to the explanations in the previous sections, which also remain applicable to the following detailed description.

Throughout the following description, like reference numerals will be used to designate functionally similar or equivalent parts and the explanations regarding a specific part made in the context of a specific embodiment also pertain to the equivalent parts in other embodiments.

FIGS. 1a-i, 2a-e and 3a-c show possible embodiments of a ball 100. The ball 100 may, for example, be a football.

The ball 100 comprises particles of an expanded material. The particles may be randomly arranged. The expanded material may comprise at least one of the following materials: expanded thermoplastic polyurethane (eTPU), expanded polyetherblockamide (ePEBA), expanded polyamide (ePA), expanded polypropylene (ePP), expanded polystyrene (ePS) and expanded ethylene-vinyl-acetate (eEVA).

It will be apparent to the skilled person that is also possible that combinations of these materials may be used as the particles within a given ball, i.e. the material composition of the particles may vary across the ball.

For example, different layers, sectors or regions of eTPU and ePEBA may be used in an inventive ball to influence the physical properties of the ball as desired. Further details on possible constructions for an inventive ball including different layers and supporting structures will be described below and it is to be understood that the above mentioned material may be used and combined in these constructions in a variety of ways within the scope of the invention.

Moreover, the ball 100 may also comprise further materials like non-expanded plastic materials, foamed plastics (for example, a two component polyurethane foam with a continuous and homogeneous structure), leather, rubber, metal wires, foils, and so forth.

The particles of the expanded material may be connected to each other. For example, the particles of the expanded material may be fused at their surfaces. The fusion of the particle surfaces can be performed by providing heat energy. This may, for example, be achieved by subjecting the particles to pressurized steam within a mold and/or by using variothermal molding and/or by means of high frequency (HF) or IR welding techniques.

For example, the particles may be connected using radio frequency (RF) and/or IR welding techniques. The surfaces of the particles may, for example, be fused using RF fusing. Other kinds electromagnetic radiation, for example radiation from a different range of the electromagnetic spectrum, may also be employed.

Alternatively, or in addition, a bonding agent may be used to connect the particles to each other. Details on the manufacture of a ball 100 will follow below.

FIGS. 1a-i show cross-sections through the center of embodiments of an inventive ball 100.

Figure 1B:
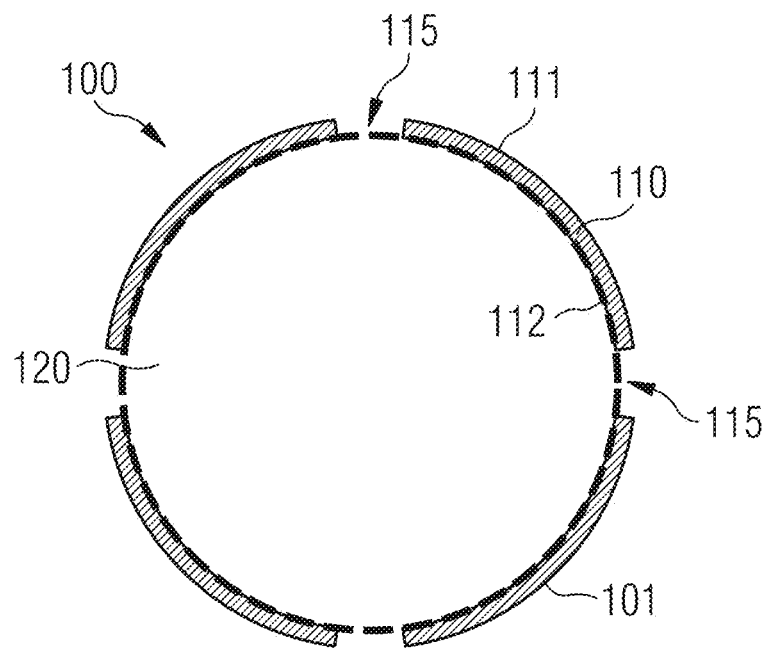
Figure 1C:
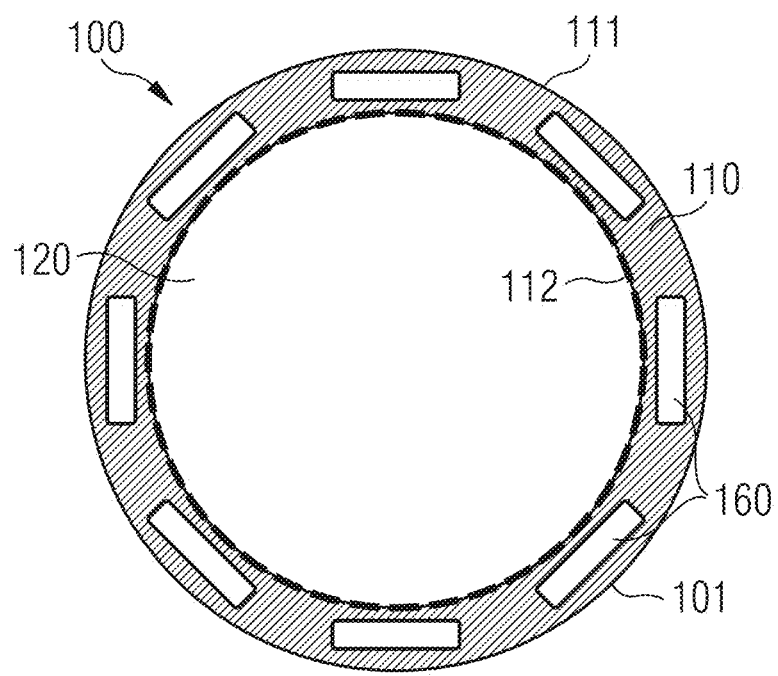
Figure 1D:
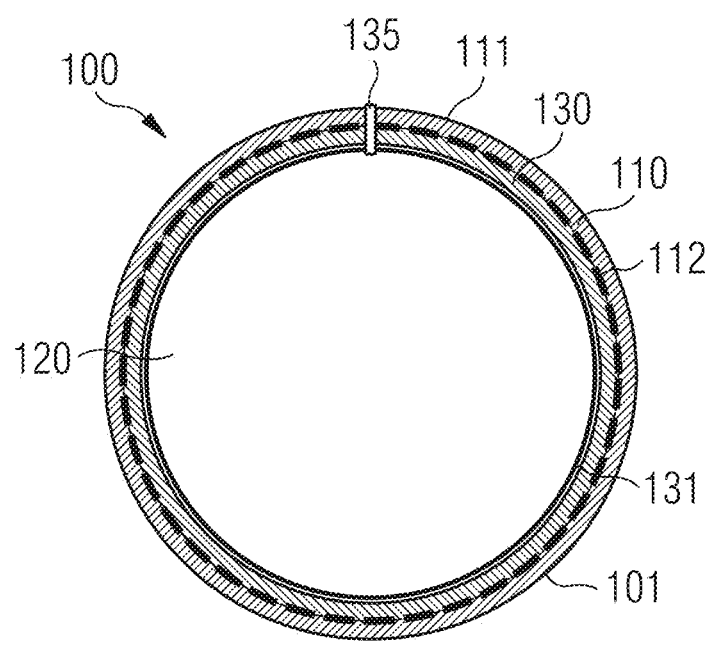
Figure 1E:
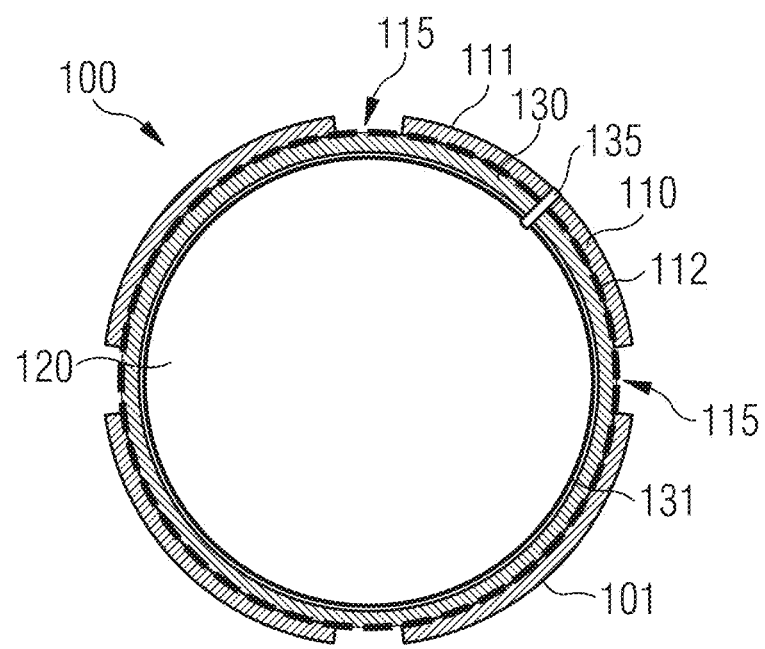
Figure 1F:
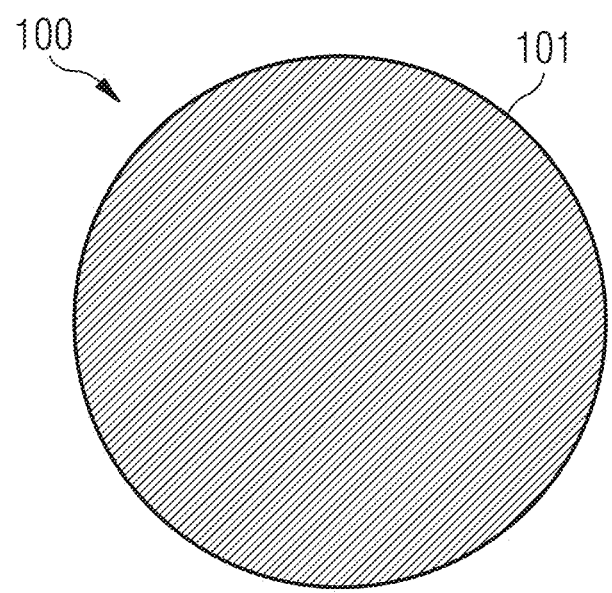

In the embodiment shown in FIG. 1f, the ball 100 is a solid ball 100. Such a solid ball 100 may be completely comprised of particles of an expanded material or it may comprise further materials or additional elements. As an example, a plastic coating or a plastic foil material may be arranged on the outward facing surface 101 of the ball 100. This coating may be applied by spraying the outward facing surface 101 of the ball 100 with the desired plastic coating/foil. Alternatively, or additionally, the outward facing surface 101 may be covered with a different spray material by methods known in the art. Furthermore, in some embodiments the outward facing surface 101 may comprise a textured surface. It is also possible that the outward facing surface 101 is only locally textured and/or that the pattern or design of the texture varies locally. It is also possible that, additionally or alternatively, the plastic coating or foil also comprises a textured surface. Again it is possible that this textured surface is only applied locally. It is further possible that the foil/coating is textured with respect to the texturing of the outward facing surface 101, for example, the texture on the coating overlies the texture on the outward facing surface 101, or the texture on the coating covers areas of no texturing on the outward facing surface 101. In this context, the outward facing surface 101 of the ball 100 is to be understood to be the surface that would enter into contact with the ball's 100 surroundings during use if no plastic coating, plastic foil material or spray material had been applied.

Figure 1G:
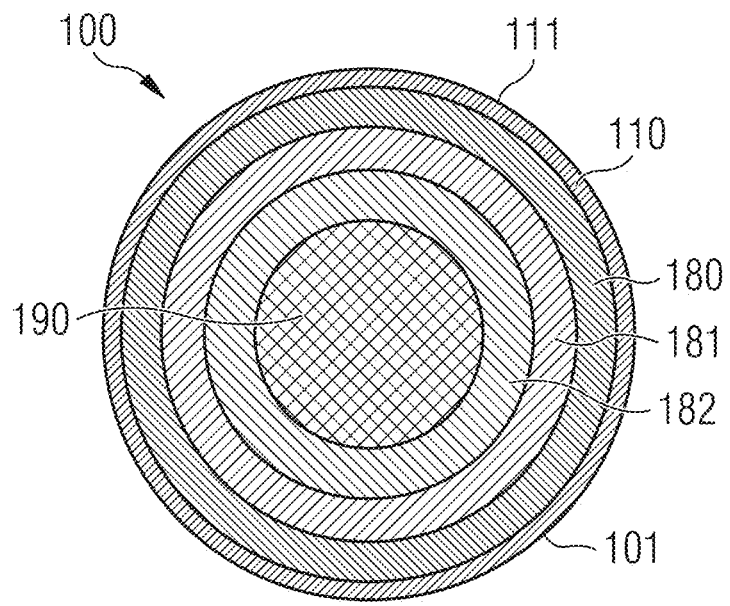
Figure 1H:
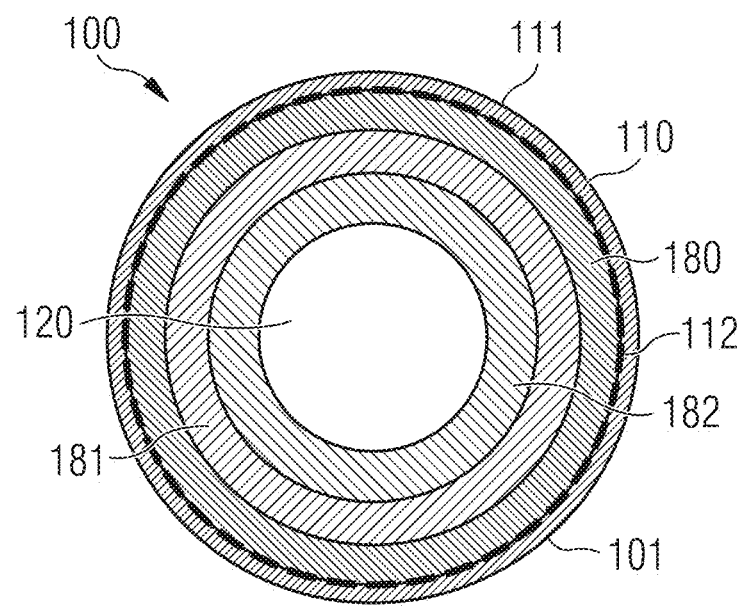

FIG. 1g shows another embodiment of a solid ball 100. Here, the ball 100 comprises a plurality of layers 110, 180, 181 and 182. The first layer 110 is provided as an outer shell of the ball 100. The first layer 110 comprises particles of the expanded material. As previously mentioned this can be a combination of different expanded materials. The outward facing surface 101 of the ball 100 is provided by the outer surface 111 of the first layer 110. The additional layers 180, 181 and 182 are inner layers here and they may also comprise particles of the expanded material. The layers 180, 181 and 182 may be comprised of the same expanded material, the expanded material varying in at least one mechanical property between the layers 180, 181 and 182, for example, density of the layer 180, 181 and 182. At least one of the layers 180, 181 and 182 may be comprised of different expanded material(s) than the other layers. At least one of the layers 180, 181 or 182 (and in principle also the first layer 110) may be a combination of expanded and non-expanded material. At least one of the layers 180, 181 or 182 (and in principal also the first layer 110) may be comprised of a non-expanded material.

Different parameters may be varied between at least one of the plurality of layers 110, 180, 181 and 182 in order to influence the properties of the ball 100. Examples of such parameters include: the thickness of the layers 110, 180, 181 and 182, the material composition of the layers 110, 180, 181 and 182, in particular the material composition of the particles within the layers 110, 180, 181 and 182, or at least one process parameter used for the manufacture of the respective layers 110, 180, 181 and 182. The above-mentioned parameters may be varied within a given layer 110, 180, 181 or 182 and/or between two or more of these layers.

As an example, different layers of eTPU and ePEBA may be used for the layers 110, 180, 181 and/or 182.

In the embodiment of a ball 100 shown in FIG. 1g, the ball further comprises a core 190. The core 190 may, for example, be comprised of an expanded material. The expanded material may be the same or different to the other layer(s) 110, 180, 181 and 182. Alternatively, the core 190 could be comprised of a non-expanded material.

The embodiments of a ball 100 shown in FIGS. 1a-e and 1h-i comprise a first layer 110 comprising particles of the expanded material. In the embodiments of a ball 100 shown in FIGS. 1a-e and 1h-i, the first layer 110 is provided as an outer shell of the ball 100.

In embodiments of an inventive ball 100, the first layer 110 may, for example, have a thickness of up to 50 mm. The thickness may in particular lie in the range between 0.5 mm and 10 mm or even in the range from 1 mm to 5 mm. It is also possible for the thickness of the first layer 110 to vary over the first layer 110 i.e. the thickness is not constant across the layer. The thickness of the first layer 110 may be graduated between thicker and thinner regions or vary locally. Furthermore, the thickness of the first layer 110 can vary such that one or more reinforcing bulges or struts are comprised on the layer, for example, on its inner side thus increasing the shape stability of the ball 100.

It is also possible, as shown in FIGS. 1d and 1e, for the first layer 110 to be arranged on a ball carcass 130.

As shown in FIGS. 1a, 1c-d and 1g-i, the first layer 110 may on the one hand comprise a closed surface (apart from a hole for a valve unit 135, see FIG. 1d).

On the other hand, it is also possible, as shown in FIGS. 1b and 1e, for the surface of the first layer 110 to comprise one or more holes or gaps 115, i.e. not to comprise a closed surface. The first layer 110 may be a connected surface in which holes 115 are arranged. A connected surface is a surface on which one can get from any point on the surface to any other point on the surface by walking along the surface and not having to "jump" over any gaps.

Figure 3A:
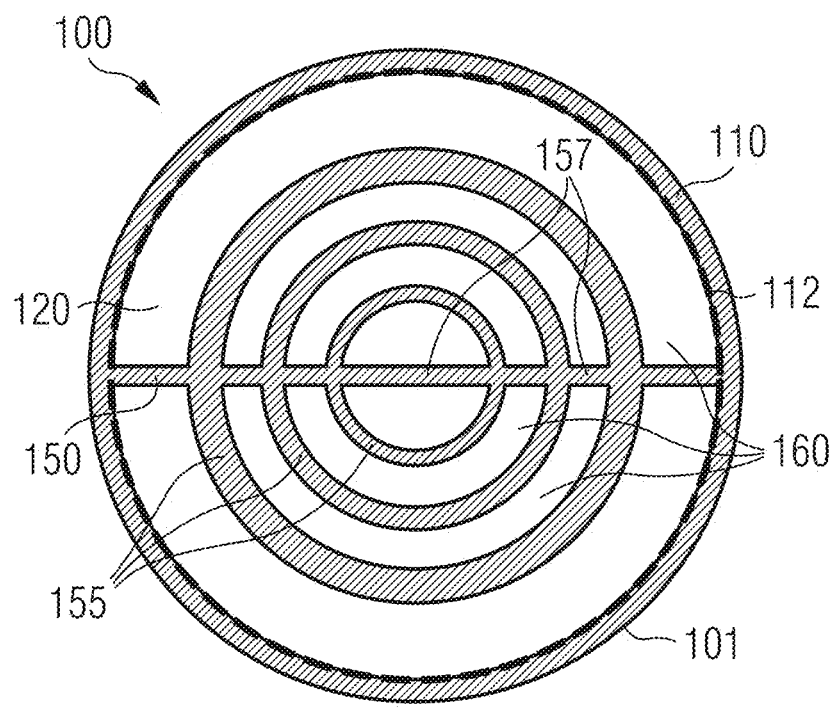
FIGS. 3a-c are cross-sectional views of various embodiments of a ball with a supporting structure.
Figure 3B:
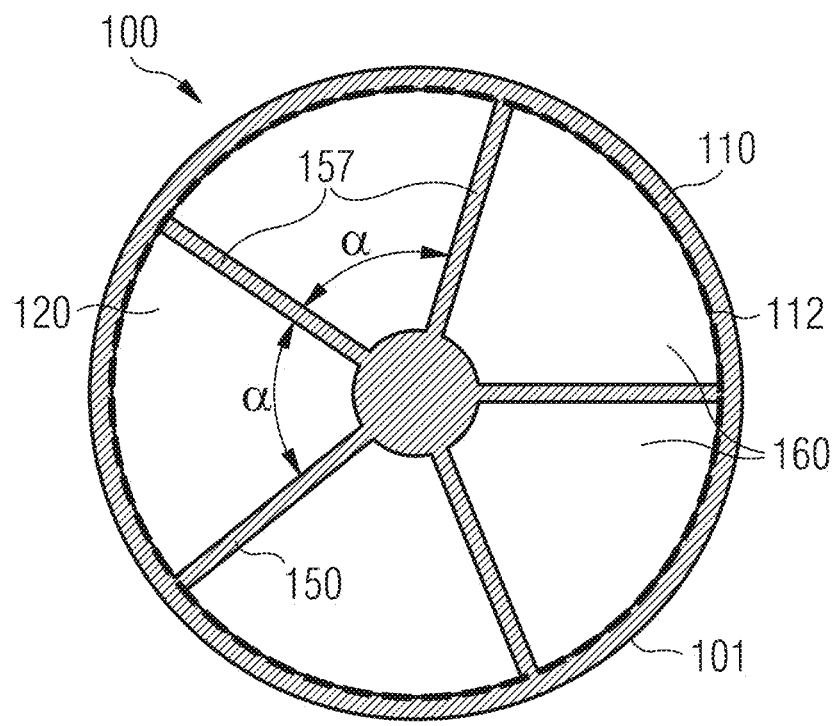
Figure 3C:
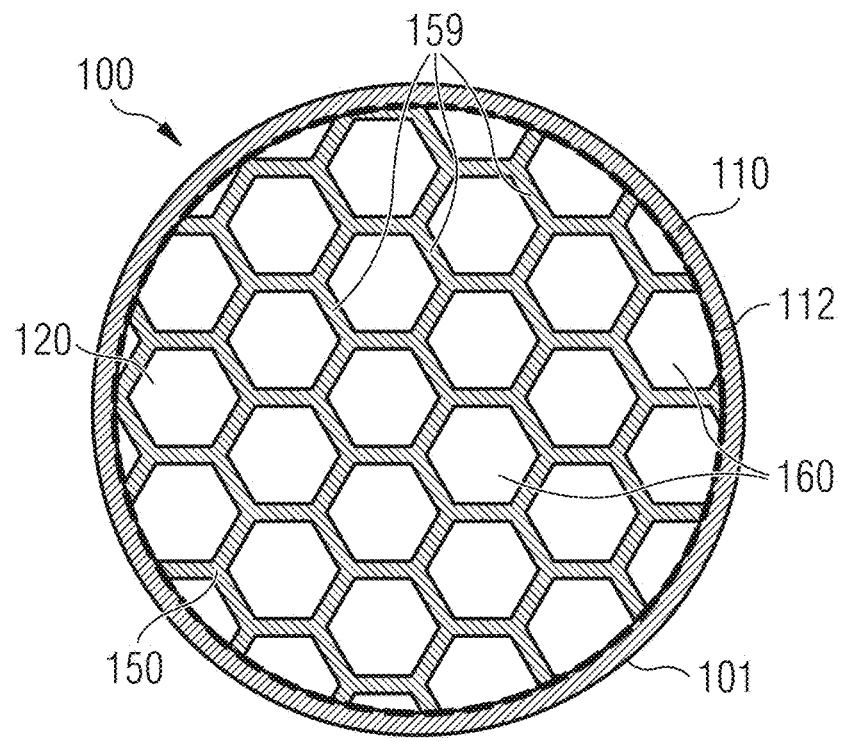

However, it is also possible for the first layer 110 to comprise several separate surface regions separated from one another by gaps 115. For example, in FIGS. 1b, 1e there may be a gap 115 running along the equator of the ball 100, separating the first layer 110 into a northern and a southern hemisphere. In such a case, the separate surface regions of the first layer 110 may be secured in their position or connected to each other by a ball carcass 130 or, as shown in FIGS. 3a-c by a supporting structure 150 (further described later for the sake of simplicity). Each of the separate surface regions may the again contain one or more holes 115. In the example of a northern and southern hemisphere mentioned above, for example, there may be a hole 115 in the northern hemisphere at the north pole and a hole 115 in the southern hemisphere at the south pole.

In both cases, the interior surface of the first layer 110 can define a conceptual surface 112 which delimits the first layer 110 from the interior of the ball 100. For ease of reference, we have named the surface 112 the "delimitation surface 112". The delimitation surface 112 can be taken to be a surface which projects around the interior surface of the first layer 110 extending across any holes/gaps 115. The conceptual delimitation surface 112 can be considered to be a closed surface.

In the embodiments shown in FIGS. 1a-e and 1h-i, the ball 100 comprises at least one cavity 120 within the spatial region delimited or bordered by the delimitation surface 112. Reference is again made to the fact that the delimitation surface 112 is merely a conceptual surface used here for explanatory reasons.

The cavity 120 need not directly adjoin the first layer 110. As an example of such a case, in the embodiment of a ball 100 shown in FIG. 1h, the ball comprises a plurality of layers 110, 180, 181 and 182 as discussed earlier in reference to FIG. 1g. In the example shown in FIG. 1h, the ball 100 has no solid core, but instead comprises a cavity 120 in its center. In this case, the cavity 120 does not directly adjoin the first layer 110 instead adjoining the innermost layer 182. However, it is highlighted that the interior surface of the first layer 110 still defines a delimitation surface 112 and the cavity 120 is arranged within the spatial region delimited or bordered by the delimitation surface 112.

In addition, the cavity 120 does not directly adjoin the first layer 110 in the embodiments of a ball 100 shown in FIGS. 1d and 1e, since here the first layer 110 is mounted on a ball carcass 130. The carcass 130 may comprise, for example, on its interior side, an inflatable bladder 131, or the carcass 130 may be comprised of such an inflatable bladder 131. However, a ball carcass 130 may also be used without an inflatable bladder. In case the ball 100 comprises a plurality of layers 110, 180, 181, 182, the ball carcass may for example be arranged inside the innermost layer 182, or it may be arranged between two of the layers.

In the embodiments shown in FIGS. 1d-e, the ball carcass 130 and the inflatable bladder 131 surround the cavity 120 and the cavity 120 directly adjoins the inside of the bladder 131. In order to allow the bladder 131 to be inflated or deflated, the ball 100 may further comprise a valve unit 135 which is connected to the bladder 131 and projects through the ball carcass 130 (where a separate carcass is present) and the outer shell 110 (and potentially further existing layers 180, 181, 182 of the ball 100).

If the first layer 110 and/or the ball carcass 130 and/or the inflatable bladder 131 comprise a closed surface (apart from the hole for a valve unit 135), the cavity 120 can be filled with a gas or gases and said gases can be retained in the cavity 120 over substantial periods of time. Examples of gases the cavity may be filled with are air or nitrogen or a combination thereof. The cavity 120 may be filled with a gas or gases at above ambient pressure. The cavity 120 can for example be filled with the gas or gases at a pressure of 1 bar, 2 bar, 3 bar, 5 bar, etc., in order to adjust the deformation properties of the ball 100. It will be apparent to the skilled person that it will be possible to use a wide range of inert gases to fill the cavity and the examples provided are merely the two most commonly used gases. To increase the time that the gas is retained within the cavity, the closed surface of the first layer 110, the ball carcass 130 and/or the bladder 131 can advantageously be designed to be essentially impermeable to the gas or gases. In this instance, essentially means as far as the selected materials and manufacturing process permit.

It is noted at this point that, within the scope of the invention, it is also possible for a ball 100 to be provided without a ball carcass 130 and/or without an inflatable bladder 131, the ball nevertheless being filled with a gas or gases under pressure.

As shown in FIG. 1c, the first layer 110 may itself comprise one or more chambers 160. These chambers 160 may also be filled with a gas or gases, such as for example air or nitrogen, and also at above ambient pressure. To allow for this possibility, the walls of the chambers 160 can be provided so that they are essentially impermeable to the gas or gases.

Figure 1I:
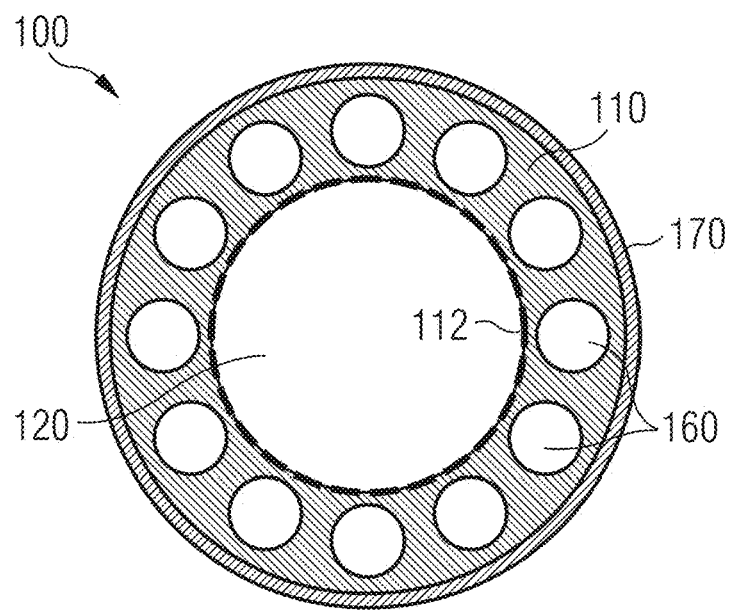

Moreover, as shown in FIG. 1i, which shows a modification of the embodiment shown in FIG. 1c, the chambers 160 can have different shapes and/or configurations. In particular, the shapes and/or configurations of the chambers 160 can vary within a given ball 100, even if this is not explicitly shown here.

The shape and/or configuration of a given chamber 160 may be modified and adapted to influence the properties of the ball 100. For example, more rectangular (or angular) chambers 160, as shown in FIG. 1c, may lead to a ball 100 with a lower rebound characteristic when compared to a ball 100 with spherical chambers 160, as shown in FIG. 1i, because the more spherical the chambers 160 the less buckling and bending that occurs when the ball 100 undergoes deformation. Furthermore the size and dimensions of a given chamber 160 may also be modified to influence the behavior of the ball 100 again. The size of the chamber 160 may influence the properties of the ball 100 in the following way: the smaller the cavity, the higher the rebound of the ball 100. Furthermore the chambers 160 can be shaped and designed such that the rebound or flight behavior of the ball 100 may be influenced. It is also conceivable that the location of the chambers 160 may be altered, for example, to provide a ball 100 with a modified flight i.e. swerving toward a direction defined by a region of the ball 100 with fewer chambers 160 or to provide a ball 100 with an unpredictable bounce. Furthermore, the chambers 160 could be arranged such that they balance out other masses in the ball 100, for example, the mass of the valve 135.

Alternatively or additionally, the outward facing surface 101 of the ball 100, which is provided by the outer surface 111 of the first layer 110 in the embodiments shown in FIGS. 1a-e and 1g-i, may comprise a textured surface. It is also possible that the outward facing surface 101 is only locally textured and/or that the pattern or design of the texture varies locally. This may for example improve the feel and handling or the aerodynamics of the ball 100.

Alternatively or additionally, a plastic coating and/or a plastic foil material may also be arranged on the outward facing surface 101 or partial regions thereof. It is also possible that, additionally or alternatively, the plastic coating or foil also comprises a textured surface. Again it is possible that this textured surface is only applied locally. It is further possible that the foil/coating is textured with respect to the texturing of the outward facing surface 101, for example, to protect an underlying texture of the outward facing surface 101, for example, against abrasion, or that, the texture on the coating overlies and accentuates the texture on the outward facing surface 101, or the texture on the coating covers areas where there is no texturing on the outward facing surface 101. The plastic coating and/or the plastic foil material may also serve the purpose of modifying the appearance of the ball 100, it may make the ball 100 more water-repellant, or it may improve the feel or aerodynamics of the ball 100. The plastic coating may for example be provided by spraying on a material.

An example of such a foil or coating is the shown by the "skin layer" 170 of the embodiment of a ball 100 shown in FIG. 1i.

FIGS. 2a-e show a further embodiment of a ball 100, in the embodiments shown a football 100. It is again reminded that the invention applies to more than just footballs. The statements made above with reference to the embodiments of FIGS. 1a-i still apply here, as emphasized by the continued use of the same reference numerals. For the sake of conciseness, only a few particular features of the embodiments shown in FIGS. 2a-e shall be discussed below.

The embodiments of a ball 100 shown in FIGS. 2a-e comprise a first layer 110 provided as an outer shell, the first layer 110 comprising particles of an expanded material. Possible expanded materials for the particles are listed at the beginning of the detailed description.

In the embodiments shown in FIGS. 2a-d, the first layer 110 is arranged on a ball carcass 130, which may, for example, be provided as an inflatable bladder or may comprise such a bladder, for example, on its interior side.

The ball carcass 130 may encompass a cavity. The ball carcass 130 may encompass the cavity in a manner essentially impermeable to air or gases such that the cavity can be filled with air or gases. The gas or gases in the cavity may be at above ambient pressure. To allow inflation or deflation, a valve unit may further be provided in the ball 100.

Figure 2A:
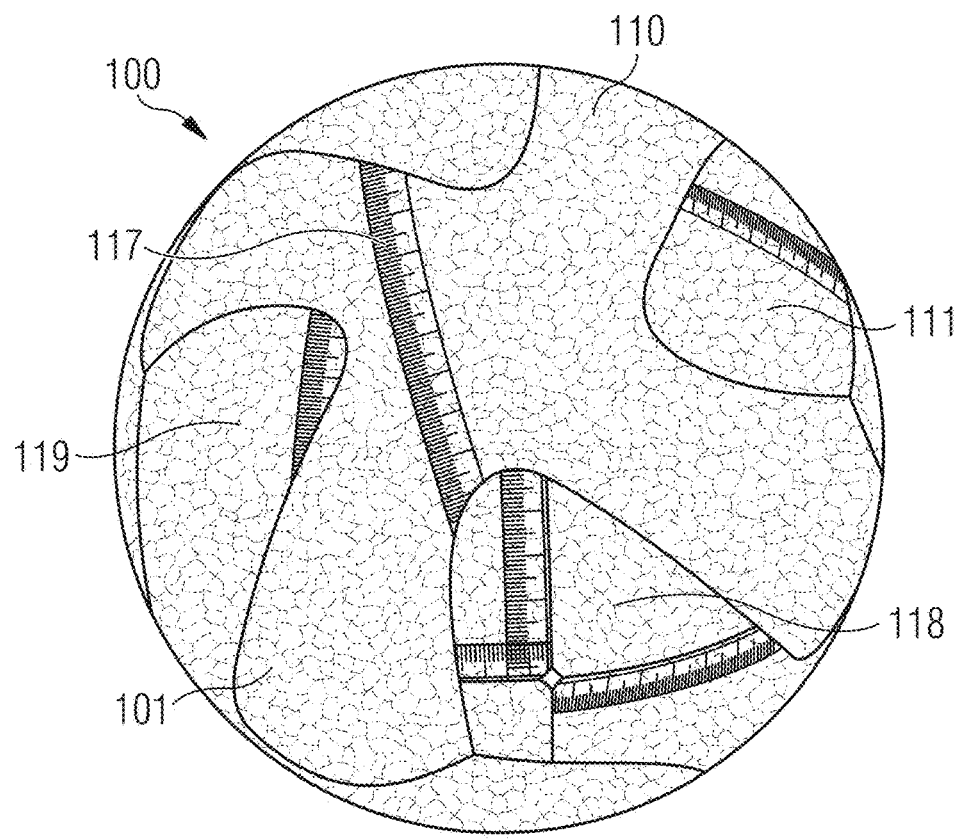
FIG. 2a is a perspective view of a ball with a plurality of ball panels, according to certain embodiments of the present invention.
Figure 2B:
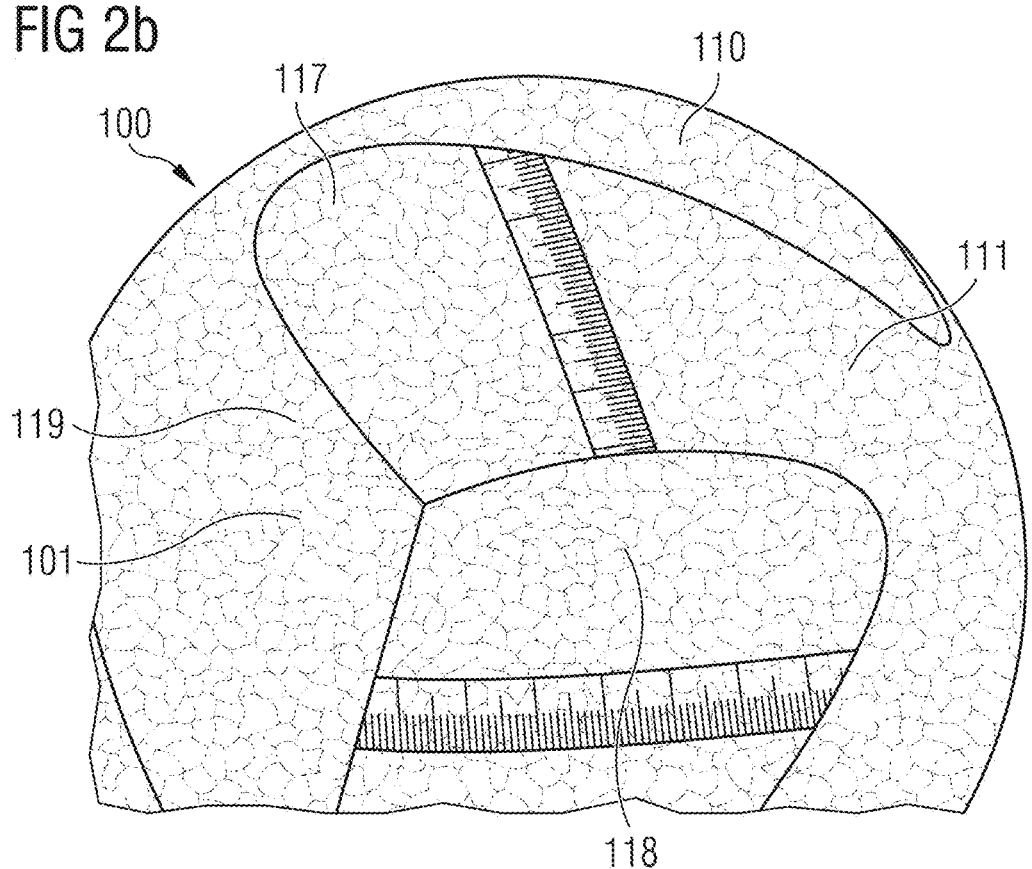
Figure 2C:
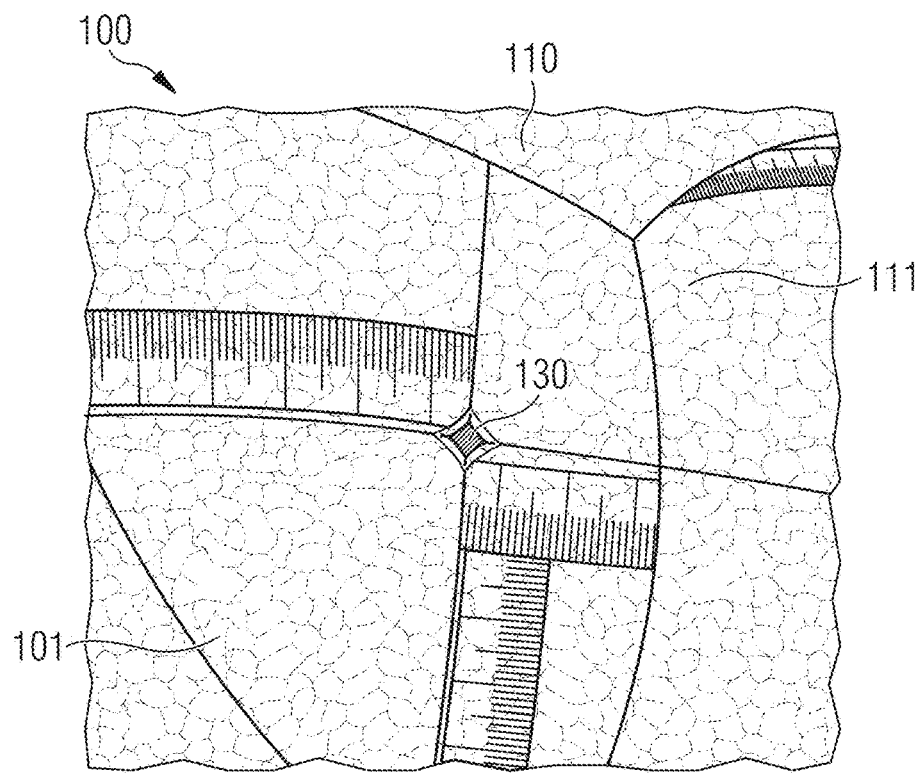
Figure 2D:
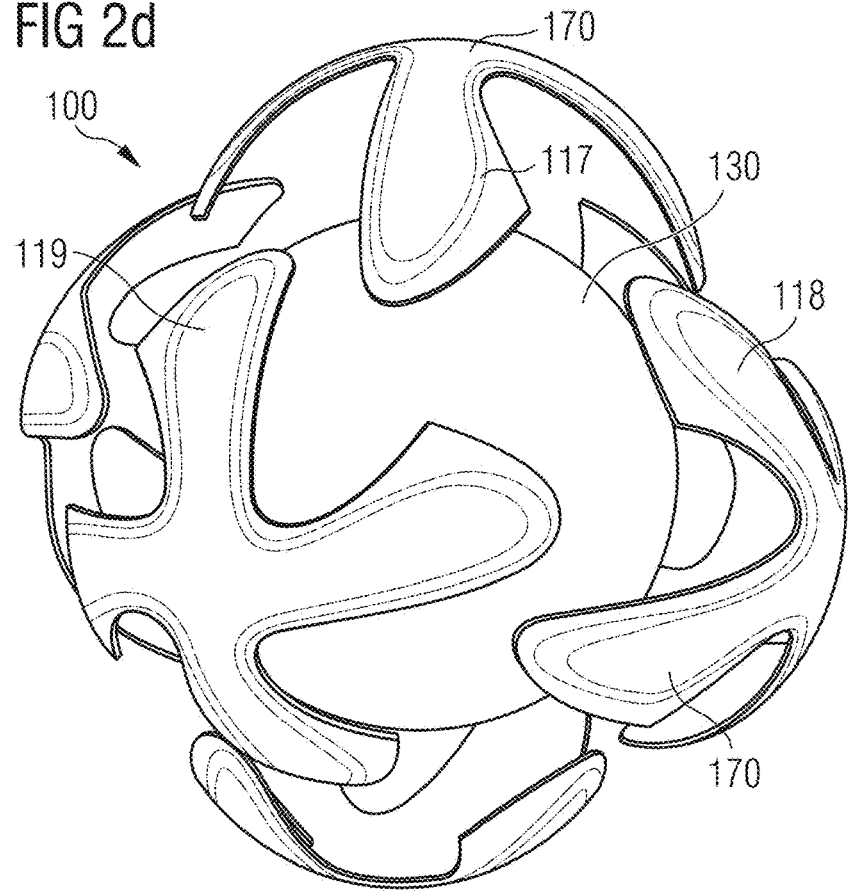
Figure 2E:
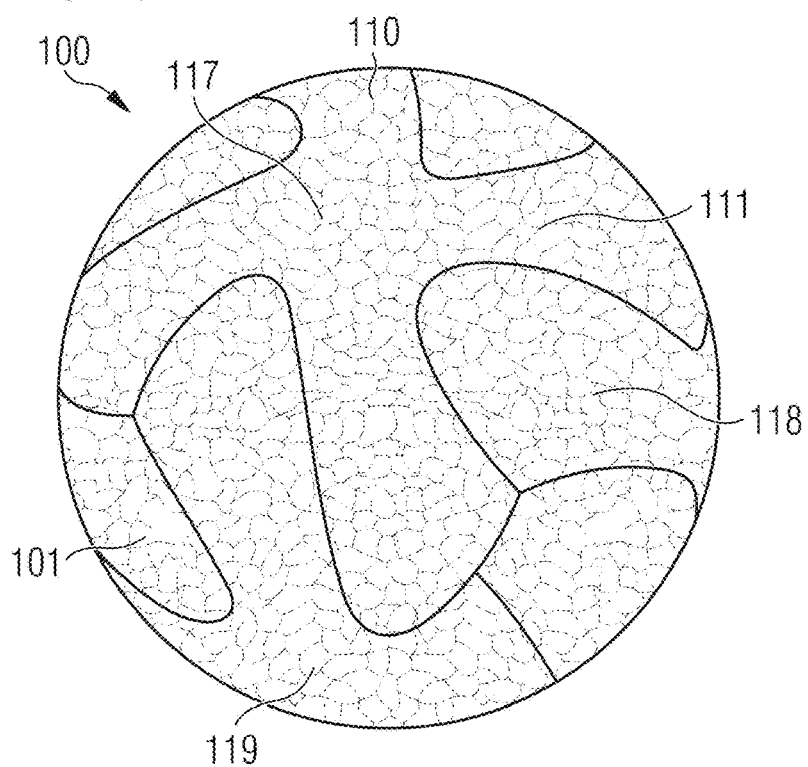
FIG. 2e is a perspective view of the ball of FIG. 2a, showing the location of boost material within the ball.

However, the ball carcass 130 may optionally be dispensed with, as exemplified by the embodiment shown in FIG. 2e. If the outer shell 110 is manufactured to form a closed surface encompassing a cavity in a manner essentially impermeable to air or gases, then a gas or gases may be maintained in the cavity at above ambient pressure even without the use of a carcass 130 or bladder.

The outer shell 110 comprises a plurality of ball panels 117, 118, 119 comprising particles of the expanded material. In the embodiments shown in FIGS. 2a-c and 2e, the ball panels 117, 118, 119 are made from the particles, the particles being connected to each other at their surfaces. This is done by subjecting the particles to heat.

For example, the panels 117, 118, 119 may be made from the particles by connecting the particles by means of RF welding and/or IR welding. For example, the surfaces of the particles may be fused using RF fusing to create the panels 117, 118, 119.

However, in other embodiments, the ball panels 117, 118, 119 may also comprise additional expanded or non-expanded materials and the surfaces of the particles may also be connected to each other in a different manner, for example by using a binding agent. Furthermore, it is possible that the panels 117, 118, 119 are comprised of different expanded materials or the same expanded materials but with different physical properties, for example, density.

The ball panels 117, 118, 119 may be produced such that they already comprise a three-dimensional curved shape (though this need not be the case), essentially (i.e. up to manufacture-related tolerances) corresponding to the shape adopted by them in the finished ball 100. In the manufacture of the ball 100, the three-dimensionally pre-shaped ball panels 117, 118, 119 may be arranged on the ball carcass 130 and then connected to each other. It is, however, also possible that the panels 117, 118, 119 are manufactured and connected, for example, by rotational molding, and a ball carcass 130 or bladder is subsequently inserted.

The exploded view in FIG. 2*d* shows in detail the three-dimensional design of the ball panels 117, 118, 119. In the shown embodiment, each of the ball panels 117, 118, 119 comprises four wings, which interlock with the wings of each adjacent ball panel, in order to form the first layer 110. Six ball panels are used in the present design. However, other designs (not shown) of the ball panels are also possible wherein the ball panels can be of a shape different to the one shown here, the shape of the panels may vary between the panels of a given ball, a different number of panels may be employed, and so forth.

Reference is again made to the possibility that the outward facing surface 101 of the ball 100, provided by the outer surface 111 of the panels 117, 118, 119 of the first layer 110 in the embodiments shown in FIGS. 2*a-e* may comprise a textured surface and/or a plastic coating and/or a plastic foil material may be arranged on the outward facing surface 101. The aforementioned possibilities regarding the application and configuration of a textured surface and/or a plastic coating and plastic foil are also applicable in their entirety to the embodiments shown in FIGS. 2*a-e*.

The result of the application of a foil material can be seen in the exploded view shown in FIG. 2*d*, where the surfaces of the ball panels 117, 118, 119 are covered with a "skin layer" comprising a plastic foil material 170, which serves the purpose of modifying the appearance of the ball as well as influencing the feel, handling and aerodynamic properties of the ball 100.

FIGS. 3*a-c* show cross sections through the center of further embodiments of an inventive ball 100. Again, for the sake of brevity, only a few particular features of the embodiments of a ball 100 shown in FIGS. 3*a-c* shall be noted below.

In each embodiment of a ball 100 shown in FIGS. 3*a-c*, the ball comprises a first layer 110, which comprises particles of an expanded material. With regard to suitable expanded materials for the particles, the statements made at the beginning of the detailed description when discussing FIGS. 1*a-i* apply. While in the embodiments of a ball 100 shown in FIGS. 3*a-c* the first layer 110 is shown to comprise a closed surface, this is not mandatory. Instead, the first layer 110 may also comprise one or more holes or the first layer 110 may even comprise a plurality of separate surface regions.

Again the interior surface of the first layer 110 defines a conceptual delimitation surface 112, and a cavity 120 is arranged within the spatial region delimited or bordered by the delimitation surface 112. Furthermore, it bears mentioning that the embodiments of a ball 100 shown in FIGS. 3*a-c* do not comprise a ball carcass or an inflatable bladder. However, such a ball carcass with or without an inflatable bladder may optionally be added.

In each of the embodiments shown in FIGS. 3*a-c*, the ball 100 comprises a supporting structure 150 that comprises particles of the expanded material. The elastic properties of the particles will at least partially be passed on to the supporting structure 150, so that it is not entirely stiff. The supporting structure 150 may, in particular, be an elastic supporting structure 150. The supporting structure 150 may also optionally comprise other expanded or non-expanded materials. In the embodiments shown in FIGS. 3*a-c*, the supporting structure 150 comprises at least one wall, bar 157 or inner shell 155, which extends within the cavity 120 of the ball 100.

For example in the embodiment of a ball 100 shown in FIG. 3*a*, the supporting structure 150 comprises a plurality of concentric, spherical inner shells 155. These are connected through one or more walls and/or bars 157 among each other and also with the first layer 110.

In the embodiment of a ball 100 shown in FIG. 3*b*, the supporting structure 150 only comprises a plurality of walls or bars 157.

In the embodiment of a ball 100 shown in FIG. 3*c*, the supporting structure 150 is provided in the form of a plurality of elements 159 connected to each other in a honeycomb structure. The elements 159 may, for example, be walls or bars. While, in the present case, the entire supporting structure 150 is provided by such elements 159, it is also possible in other embodiments for just a region of the supporting structure 150 to comprise such elements 159 with a honeycomb structure. For example, in the case of the ball 100 shown in FIG. 3*a*, such elements 159 with a honeycomb structure could be arranged between the outermost inner shell 155 and the first layer 110 of the ball 100.

The embodiment shown in FIG. 3*c* shows a specific example of a ball 100 with a supporting structure 150 comprising at least one region with a repeated 3d structure. That is, the supporting structure 150 may comprise a repeated unit or unit cell (in the case of FIG. 3*c* one honeycomb) and several of these unit cells are arranged next to each other to form the at least one region of the supporting structure 150. The several unit cells may each have the same 3d shape, but they may vary in their respective size.

The supporting structure 150 may, however, also comprise at least one region with a periodic 3d structure. In this case, the multiple unit cells arranged next to each other not only have the same 3d shape, but also the same size, as shown in FIG. 3*c*.

As depicted in FIG. 3*c*, the unit cell may be a honeycomb. The unit cell may be sphere. The unit cell may be a cube. The unit cell may be a rectangular prism. The unit cell may be a triangular prism. The unit cell may be an octagonal prism. The unit cell may be a tetrahedron. The unit cell may be a square pyramid. The unit cell may be a cubic cylinder. The unit may be a cone. The person skilled in the art will realize a number of other alternative unit cells are possible to provide the same desired effect.

In the embodiment shown in FIG. 3*a*, the inner shells 155 may be provided as concentric, spherical shells, as already mentioned. However, it should be noted that the representations in FIGS. 3*a-c* merely show a cross section along a plane through the center of the ball 100 and consequently the three-dimensional structure of the supporting structure 150 can only be partially displayed. In the embodiment shown in FIG. 3*b*, the individual elements of the supporting structure 150 can, for example, be provided as walls or as bars 157. In the embodiment shown in FIG. 3*c*, on the other hand, the supporting structure 150 may, for example, be provided by parallel tubes comprising the shown honeycomb structure in the cross section perpendicular to the tubes' axes, the tubes being formed by respective walls. However, it is also possible for the supporting structure 150 to comprise a three-dimensional design that shows a honeycomb structure also along one or more different cross sections of the ball 100. Further possible embodiments are obvious to the person skilled in the art.

It may be advantageous for the supporting structure 150 to comprise a certain degree of symmetry, such that a well-balanced ball 100 can be provided without any undesired imbalance. However, as already mentioned, it may be desirable to give the ball 100 such an imbalance for particular areas of application, such as bowling or bowls.

It may be particularly advantageous for the supporting structure 150 to comprise at least one rotational symmetry for a rotation by a particular symmetry angle, wherein the rotation may be around a symmetry axis running through the center of the ball 100. The symmetry may for example be a two-fold, three-fold, four-fold, five-fold, six-fold or a continuous rotational symmetry, i.e. the symmetry angle may amount to 180°, 120°, 90°, 72°, 60° or any angle.

For example, the supporting structure 150 of the embodiment shown in FIG. 3a is first of all symmetrical for a rotation around a symmetry axis perpendicular to the image plane through the center of the ball 100 by 180°. Furthermore, if the spherical shells 155 are connected by a common bar 157 lying in the image plane, then the supporting structure 150 is symmetrical for any rotation around a symmetry axis through the center of the ball 100 which lies in the image plane and runs in the direction of the bar 157.

In contrast, in the embodiment shown in FIG. 3b, the walls or bars 157 in the ball 100 comprise the same angle $\alpha$ between each other with respect to a symmetry axis perpendicular to the image plane and running through the center of the ball 100. In the depicted case, the angle $\alpha=72°$, such that the supporting structure 150 comprises a five-fold symmetry with respect to this symmetry axis.

With a suitable design of the honeycomb structure and a suitable arrangement within the cavity 120, the supporting structure 150 of the embodiment of a ball 100 shown in FIG. 3c may also comprise a rotational symmetry, for example a six-fold rotational symmetry, about a symmetry axis through the center of the ball 100 perpendicular to the image plane.

The supporting structure 150 may, possibly together with the first layer 110, define one or more chambers 160, which may be filled with a gas or gases, for example with air or nitrogen. If the walls of the chambers 160 are provided essentially impermeable to the gas or gases, the gas(es) may also be retained in the chambers 160 at above ambient pressure.

The cavity 120 may thus be subdivided into individual regions or cells by the chambers 160. This can allow the elastic properties of the ball 100 to be controlled particularly accurately, more accurately than could be possible with a simple inflatable bladder. More details on this topic are put forth further above in the context of the discussion of FIGS. 1c and 1i.

In order to achieve walls of the chambers 160 that are essentially impermeable to gas in such a manner, it is possible that at least a part of the supporting structure itself 150 and/or a part of the supporting structure 150 together with at least a part of the first layer 110 is integrally manufactured as a single piece. To this end, the surfaces of the particles in the supporting structure 150 and the surfaces of the particles in the first layer 110 can, for example, be directly connected to each other during manufacture where the supporting structure 150 meets the first layer 110. In one embodiment, a plurality of separate partial elements of the ball 100 are first manufactured then subsequently assembled into the finished supporting structure 150 or the finished ball 100. In each case, it may be an advantage of the ball 100 that it may be provided without a ball carcass and in particular without an inflatable bladder. The fact that the first layer 110 and the supporting structure 150 may comprise particles of the expanded material and that such expanded materials in themselves can offer excellent elastic properties may hence become relevant in an advantageous manner.

However, a supporting structure 150 can also be used without a first layer 110 comprising particles of the expanded material and vice versa. A supporting structure 150 could, for example, be used in combination with conventional ball panels.

At this point, it is noted that the explicit embodiments show so far all concern balls 100 comprising an at least approximately spherical shape. However, the invention also comprises balls with other geometries, for example rugby balls and balls for American football.

In FIGS. 4a-b and 5a-b, embodiments of an inventive method 200 for the manufacture of a ball 100 as discussed are indicated. However, FIGS. 4a-b and 5a-b are merely sketches and do not necessarily represent the actual dimensions encountered when actually performing the method 200.

Figure 4A:
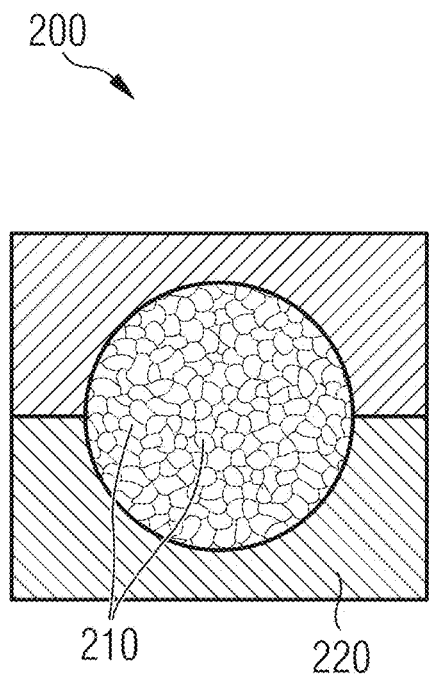
FIGS. 4a-b are cross-sectional views of a rotational mold for use with an inventive method for the manufacture of a ball, according to certain embodiments of the present invention.
Figure 4B:
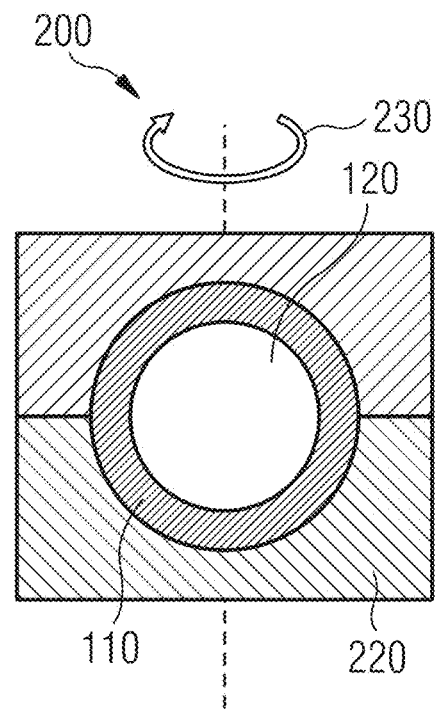

In the embodiment shown in FIGS. 4a-b, the method 200 comprises loading particles 210 of an expanded material into a rotational mold 220. At least a part of the ball 100 is then rotationally molded 230. By use of the resulting centrifugal force, and under the influence of heat energy, the particles 210 may be pressed against the rotating mold 220 and be simultaneously fused at their surfaces in order to create a one-piece ball 100 with a first layer 110 with a cavity 120 in its center. The method 200 may also comprise the successive manufacture of a plurality of layers by rotational molding 230.

In another embodiment, the method 200 comprises the manufacture of a plurality of ball panels, like panels 117, 118 and 119, which comprise particles 210 of the expanded material and which are subsequently assembled to at least partially form the ball 100.

As previously mentioned, in one embodiment the manufacture of an individual ball panel 117, 118, 119 comprises connecting the particles by means of high frequency (HF) welding, for example radio frequency (RF) welding, and/or infrared (IR) welding. For example, the manufacture of an individual ball panel 117, 118, 119 may comprise fusing the surfaces of the particles by means of RF fusing.

All of the ball panels 117, 118, 119 of a given ball 100 may be manufactured in this way, or only some of the panels while other panels of the ball are manufactured using a different method, for example as described below.

Moreover, the use of HF welding, RF welding, RF fusing and/or IR welding is not limited to the manufacture of a ball 100 including ball panels 117, 118, 119, but may also be employed for the manufacture of other embodiments of an inventive ball 100, as already mentioned numerous times.

Figure 5A:
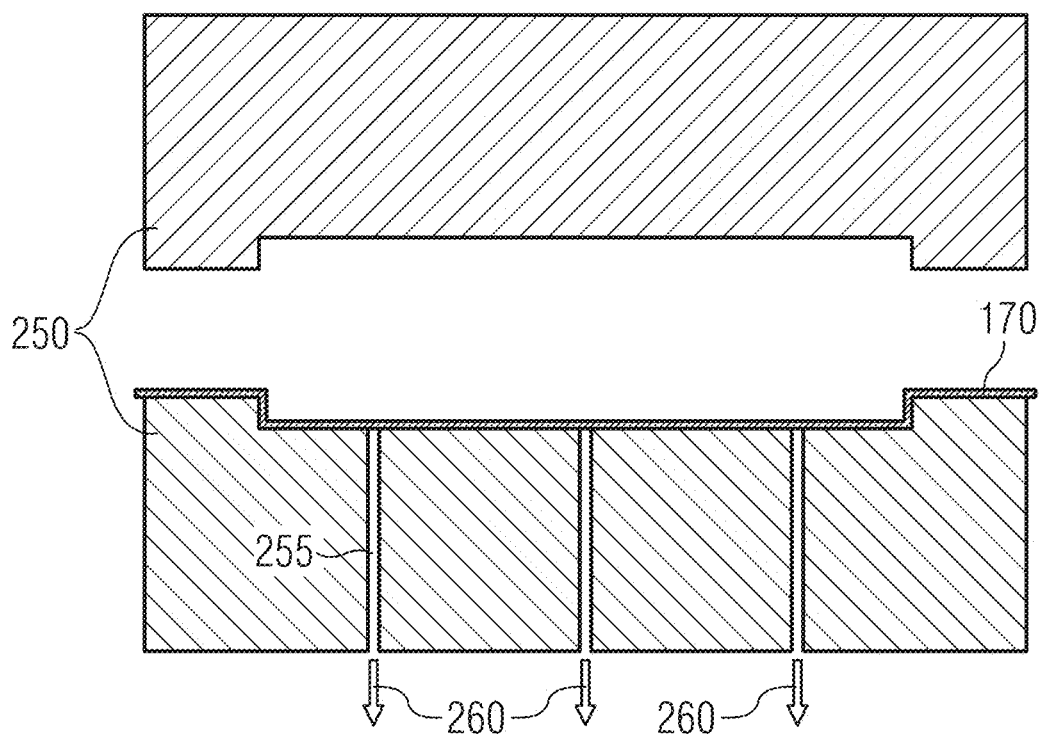
FIGS. 5a-b are cross-sectional views of a mold for use with an inventive method for the manufacture of a ball panel, according to certain embodiments of the present invention.
Figure 5B:
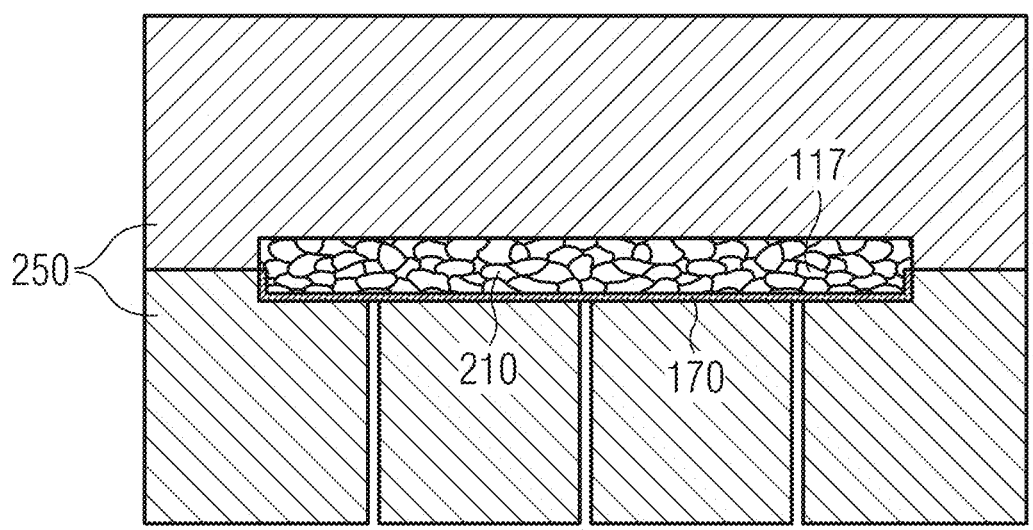

In FIGS. 5a-b, another embodiment for the manufacture of an individual ball panel 117 is indicated. The embodiment comprises the steps of loading particles of the expanded material 210 into a mold 250 (the loading is not explicitly shown) and compression molding of the particles 210 within the mold 250. Prior to loading the particles 210 into the mold, the method 200 comprises forming a first foil material within the mold 250 in the embodiment shown here. The first foil material may be a plastic foil material 170, as in the case shown in FIGS. 5a-b. The forming of the plastic foil material 170 within the mold 250 is performed by deep drawing 260 of the plastic foil material 170 by use of vacuum lines 255 in the mold 250 in the present case.

The mold 250 may be designed such that the plastic foil material 170 is located on top of the outer surface 111 of the panel 117 and hence on top of the outward facing surface 101 of the ball 100 in the assembled state of the ball 100 (cf. e.g. FIG. 2*d*), forming a "skin layer" of the ball 100, and may hence influence the appearance and performance of the ball 100. The plastic foil material 170 may, for example, increase the abrasion resistance of the panel 117 and, therefore, of the ball 100 or serve decorative purposes.

The compression molding may be performed by a laser variothermal method. The variothermal method has heating and cooling channels that are placed in very close proximity to the surface of the mold 250. This results in the surface of the mold 250 being able to be rapidly heated and cooled. The range of heating and cooling possible is 100 Kelvin in 20 seconds. In some molding configurations it is also possible to combine the heating channels configuration with specific heating equipment and liquids.

The surface of the mold 250 can be at a temperature between 80° C. and 200° C., for example at a temperature between 100° C. and 180° C., or at a temperature between 135° C. and 145° C. This has the advantage that the process cycle time for the manufacture of an individual ball panel 117 before demolding of the panel 117 can be significantly reduced, for example, the time before demolding may be less than 5 minutes and it may even be less than 3 minutes.

Alternatively to forming the first foil material in the mold 250 prior to loading the particles 210 into the mold 250, the first foil material may also be applied after compression molding of the particles 210.

In addition, the method 200 may also comprise applying a second foil material to some or all of the panels 117, 118, 119 in further possible embodiments of the method, in particular vacuum forming the second foil material over some or all of the panels 117, 118, 119. Alternatively or additionally, the method 200 may also comprise the application of a spray material onto the outward facing surface 101 of the ball 100, in particular onto the outer surface 111 of some or all of the ball panels 117, 118, 119, e.g. after the ball panels 117, 118, 119 have been assembled. This can result in the formation of a panel surface with a multi-layer film. The different layers of the film may have different properties. The multi-layer film may include an abrasion resistant layer. The multi-layer film may include a UV resistant layer. The multi-layer film may include layers to modify optical properties of the surface.

It is also conceivable that the foil layers are not applied during processing of the panels 117, 118, 119 during the mold but as spray coatings after the expanded particles 210 have been formed into a panel 117, 118, 119.

When molding layers of greater thickness it is possible to provide heat energy to fuse the particles 210 by means of steam molding as described in DE 10 2012 206 094 A1 or EP 2649896 A2.

When creating a solid ball 100 of expanded material it is furthermore possible to make the ball 100 in segments and fuse the segments together by melt-bonding or infra-red welding or gluing.

Once again, the expanded material of the particles 210 used in the method 200 may comprise at least one of the following materials: expanded thermoplastic polyurethane (eTPU), expanded polyetherblockamide (ePEBA), expanded polyamide (ePA), expanded polypropylene (ePP), expanded polystyrene (ePS), expanded ethylene-vinyl-acetate (eEVA).

In some methods of production the layers 110, 180, 181, 182 and/or panels 117, 118, 119 of expanded material may be bonded to the carcass 130 of the ball 100 by melt-bonding.

In the following, further examples are described to facilitate the understanding of the invention:

1. Ball (100), in particular a football, comprising particles (210) of an expanded material.
2. Ball (100) according to example 1, wherein the expanded material comprises at least one of the following materials: expanded thermoplastic polyurethane, eTPU, expanded polyetherblockamide, ePEBA, expanded polyamide, ePA, expanded polypropylene, ePP, expanded polystyrene, ePS, expanded ethylene-vinyl-acetate, eEVA.
3. Ball (100) according to any one of examples 1 or 2, wherein the particles (210) are connected to each other, in particular fused at their surfaces.
4. Ball (100) according to any one of examples 1-3, wherein a plastic coating and/or a plastic foil material (170) is arranged on an outward facing surface (101) of the ball (100).
5. Ball (100) according to any one of examples 1-4, wherein an outward facing surface (101) of the ball (100) and/or the plastic coating of example 4 and/or the plastic foil material (170) of example 4 comprises a textured surface.
6. Ball (100) according to any one of examples 1-5, comprising at least a first layer (110) of the particles (210) of the expanded material, in particular a first layer (110) provided as an outer shell.
7. Ball (100) according to example 6, comprising a plurality of layers (110; 180; 181; 182), in particular a plurality of layers (110; 180; 181; 182) with the particles (210) of the expanded material.
8. Ball (100) according to example 7, wherein a thickness of the layers (110; 180; 181; 182) and/or a composition of the material of the layers (110; 180; 181; 182), in particular a composition of the expanded material of the particles (210), and/or at least one process parameter for the manufacture of the layers (110; 180; 181; 182) vary between at least one of the plurality of layers (110; 180; 181; 182).
9. Ball (100) according to any one of examples 6-8, wherein the first layer (110) comprises a thickness in the range of 0.5 mm-10 mm, and preferably in the range of 1 mm-5 mm.
10. Ball (100) according to any one of examples 6-9, wherein the first layer (110) comprises a plurality of ball panels (117; 118; 119) with the particles (210) of the expanded material.
11. Ball (100) according to example 10, the ball (100) being at least partially manufacturable by assembling three-dimensionally pre-shaped ball panels (117; 118; 119).
12. Ball (100) according to any one of examples 6-11, comprising at least one cavity (120), wherein the first layer (110) is arranged around the cavity (120).
13. Ball (100) according to example 12, wherein the first layer (110) is arranged on a ball carcass (130) which surrounds the cavity (120).
14. Ball (100) according to example 13, wherein the ball carcass (130) comprises an inflatable bladder (131).
15. Ball (100) according to any one of examples 12-14, wherein the cavity (120) is filled with at least one gas at above ambient pressure.

16. Ball (100) according to any one of examples 1-15, comprising a supporting structure (150), in particular an elastic supporting structure (150), with the particles (210) of the expanded material.
17. Ball (100) according to example 16 in combination with any one of examples 12-15, wherein the supporting structure (150) comprises at least one of: a wall extending within the cavity, a bar (157) extending within the cavity, and an inner shell (155) extending within the cavity.
18. Ball (100) according to any one of examples 16 or 17, wherein the supporting structure (150) comprises at least one spherical inner shell (155).
19. Ball (100) according to any one of examples 16-18, wherein the supporting structure (150) comprises at least one region with a repeated 3d structure.
20. Ball (100) according to any one of examples 16-19, wherein the supporting structure (150) comprises at least one rotational symmetry for a rotation by a symmetry angle ($\alpha$) around a symmetry axis running through a center of the ball (100).
21. Ball (100) according to example 20, wherein the symmetry angle ($\alpha$) is one of 120°, 90°, 72°, 60° or a continuous rotation.
22. Ball (100) according to any one of examples 6-21, wherein the first layer (110) and/or the supporting structure (150) define at least one chamber (160), and preferably wherein the at least one chamber (160) is filled with at least one gas at above ambient pressure.
23. Ball (100) according to any one of examples 22, wherein at least a part of the first layer (110) and at least a part of the supporting structure (150) are integrally manufactured as a single piece.
24. Ball (100) according to any one of examples 1-11, wherein the ball (100) is a solid ball.
25. Ball (100) according to example 24, comprising a core (190) of non-expanded material.
26. Ball (100) according to any one of examples 1-13 or 15-25, wherein the ball does not comprise an inflatable bladder (131).
27. Method (200) for the manufacture of a ball (100) according to any one of examples 1-26.
28. Method (200) for the manufacture of a ball (100), the method (200) comprising loading particles (210) of an expanded material into a rotational mold (220) and rotationally molding (230) at least a part of the ball (100).
29. Method (200) according to example 28, comprising the successive manufacture of a plurality of layers (110; 180; 181; 182) by rotational molding (230).
30. Method (200) for the manufacture of a ball, the method comprising the manufacture of a plurality of ball panels (117; 118; 119) which comprise particles (210) of an expanded material and which are assembled to at least partially form the ball (100).
31. Method (200) according to example 30, wherein the manufacture of an individual ball panel (117; 118; 119) comprises the steps of loading particles (210) of the expanded material into a mold (250) and compression molding of the particles (210) within the mold (250).
32. Method (200) according to the preceding example 31, wherein the compression molding comprises compression molding performed by a laser variothermal method.
33. Method (200) according to any one of examples 31 or 32, further comprising forming a first foil material within the mold (250), in particular vacuum forming (260) the first foil material within the mold (250), prior to loading the particles (210) into the mold (250).
34. Method (200) according to any one of examples 31-33, wherein the compression molding is performed at a temperature between 80° C. and 200° C., and preferably at a temperature between 100° C. and 180° C., and particularly preferably at a temperature between 135° C. and 145° C.
35. Method (200) according to any one of examples 31-34, wherein the process cycle time for the manufacture of an individual ball panel (117; 118; 119) before demolding of the panel (117; 118; 119) is less than 5 minutes, and preferably less than 3 minutes.
36. Method (200) according to any one of examples 30-35, further comprising applying a second foil material to some or all of the panels (117; 118; 119), in particular vacuum forming the second foil material over some or all of the panels (117; 118; 119).
37. Method according to any one of examples 28-36, wherein the expanded material comprises at least one of the following materials: expanded thermoplastic polyurethane, eTPU, expanded polyetherblockamide, ePEBA, expanded polyamide, ePA, expanded polypropylene, ePP, expanded polystyrene, ePS, expanded ethylene-vinyl-acetate, eEVA.
38. Method according to any one of examples 28-37, further comprising the application of a spray material onto an outward facing surface (101) of the ball (100), in particular onto an outer surface of some or all of the ball panels (117; 118; 119).

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A ball comprising an outer shell and an inner bladder, wherein the outer shell comprises particles of an expanded material, wherein the particles consist of at least one of expanded thermoplastic polyurethane (eTPU), expanded polyetherblockamide (ePEBA), expanded polyamide (ePA), expanded polypropylene (ePP), expanded polystyrene (ePS), and expanded ethylene-vinyl-acetate (eEVA), wherein the particles are connected to each other by fusing at their surfaces without damaging the cell structure of the interior of the particles, and wherein the outer shell comprises layers of smaller particles interspersed between layers of larger particles.

2. The ball according to claim 1, wherein the particles are connected, at least partially, by radio frequency welding and/or infrared welding.

3. The ball according to claim 1, wherein a plastic coating and/or a plastic foil material is arranged on an outward facing surface of the ball, and wherein the outward facing surface of the ball and/or the plastic coating and/or the plastic foil material comprises a textured surface.

4. The ball according to claim 1, wherein at least one of a thickness of the plurality of layers, a composition of a material of the plurality of layers, and at least one process parameter for the manufacture of the plurality of layers vary between at least one of the plurality of layers.

5. The ball according to claim 1, wherein the outer shell comprises a plurality of ball panels comprising the particles of the expanded material.

6. The ball according to claim 1, wherein the inner bladder comprises an inflatable bladder.

7. The ball according to claim 1, comprising a supporting structure with the particles of the expanded material.

8. The ball according to claim 7, wherein the supporting structure comprises at least one of: a wall extending within at least one cavity, a bar extending within the at least one cavity, and an inner shell extending within the at least one cavity.

9. The ball according to claim 7, wherein the supporting structure comprises at least one region with a repeated 3D structure.

10. The ball according to claim 7, wherein the supporting structure comprises at least one rotational symmetry for a rotation by a symmetry angle ( ) around a symmetry axis running through a center of the ball.

11. The ball according to claim 7, wherein the outer shell and/or the supporting structure define at least one chamber, and wherein the at least one chamber is filled with at least one gas at above ambient pressure.

12. The ball according to claim 11, wherein at least a part of the outer shell and at least a part of the supporting structure are integrally manufactured as a single piece.

13. A method for the manufacture of a ball comprising an outer shell and an inner bladder, wherein the outer shell comprises particles of an expanded material, the method comprising connecting the particles of the expanded material by radio frequency welding and/or infrared welding, wherein the particles consist of at least one of expanded thermoplastic polyurethane (eTPU), expanded polyetherblockamide (ePEBA), expanded polyamide (ePA), expanded polypropylene (ePP), expanded polystyrene (ePS), and expanded ethylene-vinyl-acetate (eEVA); and further wherein the particles are connected to each other by fusing at their surfaces without damaging the cell structure of the interior of the particles and the outer shell comprises layers of smaller particles interspersed between layers of larger particles.

14. A method for the manufacture of a ball comprising an outer shell and an inner bladder, wherein the outer shell comprises particles of an expanded material, the method comprising loading the particles of the expanded material into a rotational mold and rotationally molding at least a part of the ball, wherein the particles consist of at least one of expanded thermoplastic polyurethane (eTPU), expanded polyetherblockamide (ePEBA), expanded polyamide (ePA), expanded polypropylene (ePP), expanded polystyrene (ePS), and expanded ethylene-vinyl-acetate (eEVA); and further wherein the particles are connected to each other by fusing at their surfaces without damaging the cell structure of the interior of the particles and the outer shell comprises layers of smaller particles interspersed between layers of larger particles.

15. The ball according to claim 1, wherein the outer shell comprises a thickness from 0.5 mm to 10 mm.

* * * * *